(12) United States Patent
Kanno

(10) Patent No.: US 10,761,733 B2
(45) Date of Patent: Sep. 1, 2020

(54) STORAGE DEVICE THAT WRITES DATA FROM A HOST DURING GARBAGE COLLECTION

(71) Applicant: Toshiba Memory Corporation, Tokyo (JP)

(72) Inventor: Shinichi Kanno, Ota Tokyo (JP)

(73) Assignee: Toshiba Memory Corporation, Tokyo (JP)

( * ) Notice: Subject to any disclaimer, the term of this patent is extended or adjusted under 35 U.S.C. 154(b) by 233 days.

(21) Appl. No.: 15/441,068

(22) Filed: Feb. 23, 2017

(65) Prior Publication Data
US 2018/0088805 A1  Mar. 29, 2018

(30) Foreign Application Priority Data
Sep. 23, 2016 (JP) ................. 2016-185477

(51) Int. Cl.
| | | |
|---|---|---|
| G06F 12/00 | (2006.01) | |
| G06F 12/08 | (2016.01) | |
| G06F 13/00 | (2006.01) | |
| G06F 3/06 | (2006.01) | |
| G06F 12/02 | (2006.01) | |
| G06F 12/10 | (2016.01) | |

(52) U.S. Cl.
CPC .............. *G06F 3/061* (2013.01); *G06F 3/065* (2013.01); *G06F 3/068* (2013.01); *G06F 3/0656* (2013.01); *G06F 3/0679* (2013.01); *G06F 12/0246* (2013.01); *G06F 12/0253* (2013.01); *G06F 12/10* (2013.01); *G06F 2212/7201* (2013.01); *G06F 2212/7204* (2013.01); *G06F 2212/7205* (2013.01); *G06F 2212/7206* (2013.01)

(58) Field of Classification Search
CPC ........ G06F 3/065; G06F 3/0656; G06F 3/079; G06F 12/0246
USPC ......................................................... 711/165
See application file for complete search history.

(56) References Cited

U.S. PATENT DOCUMENTS

| | | | | |
|---|---|---|---|---|
| 5,946,708 A | * | 8/1999 | Fang | G06F 12/0866 710/22 |
| 7,796,426 B2 | * | 9/2010 | Tonomura | G11C 7/04 363/158 |
| 7,925,846 B2 | * | 4/2011 | Ebata | G06F 3/0608 711/154 |
| 2003/0065688 A1 | * | 4/2003 | Dageville | G06F 16/24561 |
| 2009/0259786 A1 | * | 10/2009 | Lin | G06F 13/4027 710/110 |

(Continued)

FOREIGN PATENT DOCUMENTS

JP        4358299 B2     11/2009

*Primary Examiner* — Mohamed M Gebril
(74) *Attorney, Agent, or Firm* — Kim & Stewart LLP

(57) ABSTRACT

A memory system includes a controller, a buffer, and a nonvolatile memory including a plurality of blocks, wherein each of the blocks includes a plurality of pages and each of the pages includes a plurality of unit data portions. The controller is configured to carry out garbage collection by reading data from one or more pages of a target block of the garbage collection and selectively copying valid unit data portions included in the read data to another block, count a number of invalid unit data portions included in the read data, and accept, in the buffer, unit data portions from a host as write data, up to a number determined based on the counted number, during the garbage collection.

14 Claims, 14 Drawing Sheets

(56) References Cited

U.S. PATENT DOCUMENTS

| | | | |
|---|---|---|---|
| 2011/0055455 A1* | 3/2011 | Post | G06F 12/0246 711/103 |
| 2012/0254514 A1* | 10/2012 | Nishikubo | G06F 12/0246 711/103 |
| 2012/0254581 A1* | 10/2012 | Kim | G11C 11/5621 711/203 |
| 2013/0019057 A1* | 1/2013 | Stephens | G06F 3/0638 711/103 |
| 2013/0073789 A1* | 3/2013 | Khmelnitsky | G06F 3/0685 711/103 |
| 2013/0166818 A1* | 6/2013 | Sela | G06F 12/0246 711/103 |
| 2013/0191700 A1* | 7/2013 | Griffin | G06F 11/076 714/759 |
| 2013/0227237 A1* | 8/2013 | Tashiro | G06F 3/067 711/170 |
| 2013/0246891 A1* | 9/2013 | Manning | G06F 11/1068 714/773 |
| 2014/0173176 A1* | 6/2014 | Kang | G06F 12/0246 711/103 |
| 2014/0189263 A1* | 7/2014 | Shaharabany | G06F 3/0656 711/154 |
| 2015/0074335 A1* | 3/2015 | Matsudaira | G06F 12/0246 711/103 |
| 2015/0113206 A1* | 4/2015 | Fitzpatrick | G11C 16/3495 711/103 |
| 2015/0161036 A1* | 6/2015 | Camp | G06F 11/1012 711/103 |
| 2016/0110114 A1* | 4/2016 | Moon | G06F 12/0253 711/103 |
| 2016/0154594 A1* | 6/2016 | Kang | G06F 3/0688 711/103 |
| 2016/0170903 A1* | 6/2016 | Kanno | G06F 12/0246 711/103 |
| 2016/0188226 A1* | 6/2016 | Haines | G06F 3/0619 711/103 |
| 2016/0283369 A1* | 9/2016 | Hada | G06F 12/0246 |
| 2016/0344834 A1* | 11/2016 | Das | G06F 11/3476 |
| 2017/0024140 A1* | 1/2017 | Shivanand | G06F 3/0604 |
| 2017/0060448 A1* | 3/2017 | Schnarch | G06F 3/0652 |
| 2017/0083436 A1* | 3/2017 | Jung | G06F 12/0246 |
| 2017/0123972 A1* | 5/2017 | Gopinath | G06F 12/0253 |
| 2017/0147232 A1* | 5/2017 | Hung | G06F 3/0658 |
| 2017/0147502 A1* | 5/2017 | Byun | G06F 12/1009 |
| 2017/0177235 A1* | 6/2017 | Nishikubo | G06F 3/0611 |
| 2017/0235495 A1* | 8/2017 | Lin | G06F 3/065 711/103 |
| 2018/0024920 A1* | 1/2018 | Thomas | G06F 12/0246 711/103 |
| 2018/0060367 A1* | 3/2018 | Ioannou | G06F 16/2272 |
| 2018/0088805 A1* | 3/2018 | Kanno | G06F 12/0253 |
| 2018/0108404 A1* | 4/2018 | Miura | G11C 13/0069 |
| 2018/0165022 A1* | 6/2018 | Tomic | G06F 12/0246 |

* cited by examiner

STORAGE DEVICE THAT WRITES DATA FROM A HOST DURING GARBAGE COLLECTION

CROSS-REFERENCE TO RELATED APPLICATION

This application is based upon and claims the benefit of priority from Japanese Patent Application No. 2016-185477, filed Sep. 23, 2016, the entire contents of which are incorporated herein by reference.

FIELD

Embodiments described herein relate generally to a technology of controlling a nonvolatile memory.

BACKGROUND

Today, a memory system including a nonvolatile memory is widely used. An example of such a memory system includes a solid state drive (SSD) based on a NAND flash technology. The SSD is characteristic in low power consumption and high-speed performance, and is typically used as a main storage of various computers. Improved performance on data input/output between a host and a memory system is desired.

DETAILED DESCRIPTION

In order to improve performance of data input/output between a host and a memory system, a new function for reducing variation in write latency may be needed.

An embodiment provides a memory system and a control method directed to reducing variation in write latency.

According to an embodiment, a memory system includes a controller, a buffer, and a nonvolatile memory including a plurality of blocks, wherein each of the blocks includes a plurality of pages and each of the pages includes a plurality of unit data portions. The controller is configured to carry out garbage collection by reading data from one or more pages of a target block of the garbage collection and selectively copying valid unit data portions included in the read data to another block, count a number of invalid unit data portions included in the read data, and accept, in the buffer, unit data portions from a host as write data, up to a number determined based on the counted number, during the garbage collection.

Hereinafter, embodiments will be described with reference to the drawings.

Figure 1:
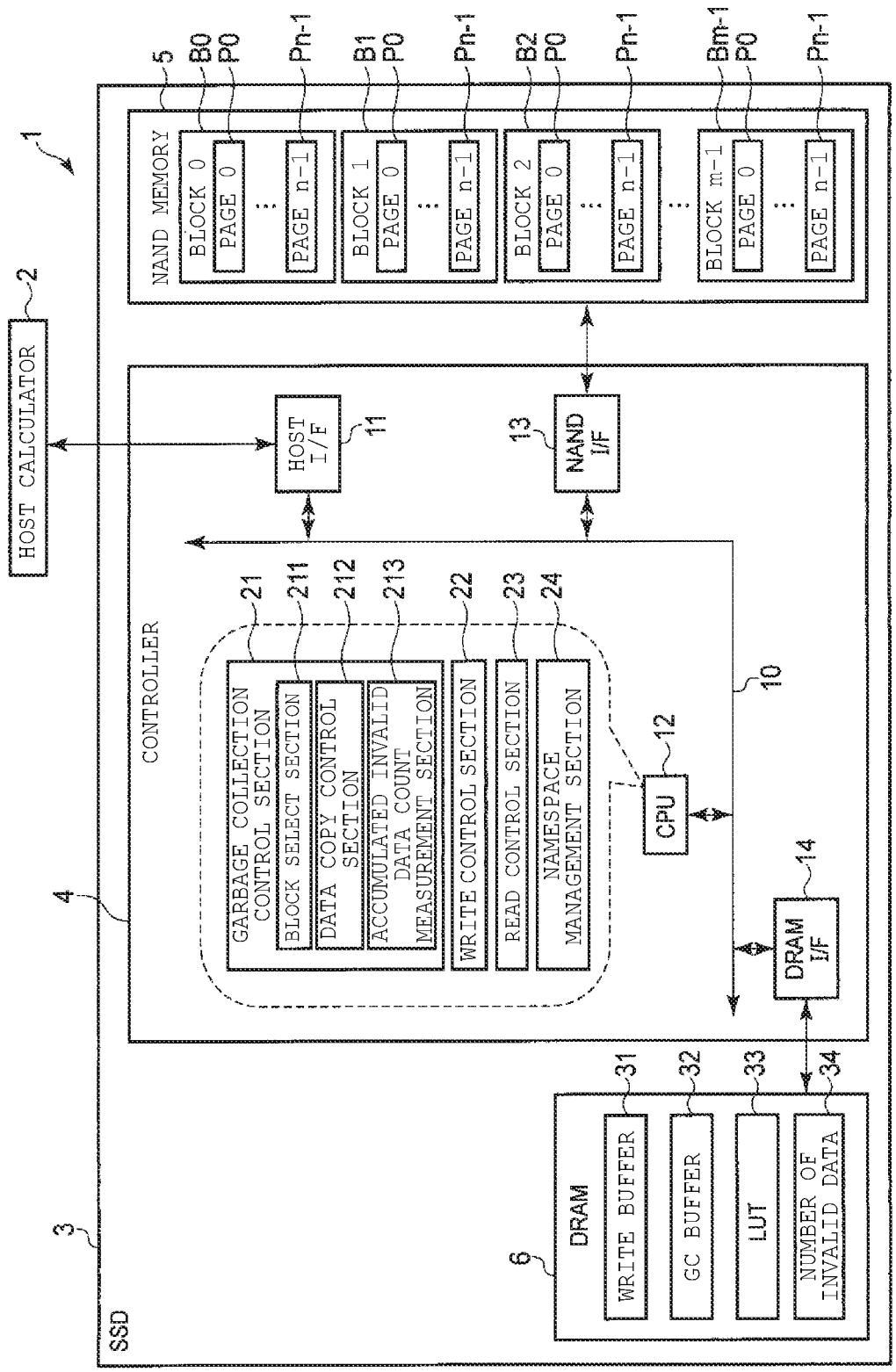
FIG. 1 is a block diagram of an information processing system including a memory system according to an embodiment.

First, the description will be made about a configuration of an information processing system 1 which includes the memory system according to an embodiment with reference to FIG. 1.

The memory system is a semiconductor storage device which is configured to write data in the nonvolatile memory and to read data from the nonvolatile memory. The memory system is achieved by a solid state drive (SSD) 3 based on a NAND flash technology, for example.

The information processing system 1 includes a host calculator (hereinafter, also referred to as host) 2 and the SSD 3. The host 2 is an information processing device (computing device) which is configured to store data in the SSD 3. Examples of the information processing device include a server computer and a personal computer.

The SSD 3 may be included in the information processing device which serves as the host 2, or may be externally connected to the information processing device through a cable or a network.

An interface to connect the host 2 and the SSD 3 may be used SCSI, Serial Attached SCSI (SAS), ATA, Serial ATA (SATA), PCI Express (PCIe), NVM Express (NVMe), the Ethernet (registered trademark), and Fibre channel.

The SSD 3 may include a controller 4, a nonvolatile memory (NAND memory) 5, and a DRAM 6. The NAND memory 5 may contain a plurality of NAND flash memory chips while not limited in number.

The NAND memory 5 includes a memory cell array. The memory cell array includes a number of NAND blocks (blocks) B0 to Bm−1. One block corresponds to a unit of erasing. The block may be called a "physical block" or an "erase block".

Each of the blocks B0 to Bm−1 includes a number of pages (physical pages). In other words, each of the blocks B0 to Bm−1 includes pages P0 to Pn−1. A plurality of memory cells connected to the same word line are organized as one page. In the NAND memory 5, data read and data write are performed in units of one page. The data erase is performed in units of one block.

The controller 4 is electrically connected to the NAND memory (nonvolatile memory) 5 through a NAND interface 13 such as Toggle and ONFI. The controller 4 may serve as a flash translation layer (FTL) which is configured to perform data management of the NAND memory 5 and block management of the NAND memory 5.

The data management includes (1) management of mapping information which indicates a correspondence between a logical block address (LBA) and a physical address and (2) a process of hiding reading/writing in units of page and erasing in units of block. The mapping management between the LBA and the physical address is performed using a lookup table (LUT) 33 which serves as a logical/physical address conversion table. The lookup table (LUT) 33 is created in units of predetermined management size, and manages the mapping between the LBA and the physical address in units of the management size. Most of write commands from the host 2 require writing of 4 KB data. For that reason, the lookup table (LUT) 33 may manage the mapping between the LBA and the physical address in units of 4 KB for example. The physical address corresponding to a certain LBA indicates a physical memory location of the NAND memory 5 in which the data of the LBA are written. The physical address includes a physical block address and a physical page address. The physical page address is allocated to all pages, and the physical block address is allocated to all blocks.

The data writing to a page can be made only one time per one erase cycle.

For that reason, the controller 4 maps rewritten data associated with the same LBA to a page of the NAND memory 5 different from a page in which original (old) data are written. In other words, the controller 4 writes the written data in another (new) page. The controller 4 updates the lookup table (LUT) 33 to associate the LBA with the new page, and invalidates the original page (that is, the old data).

The block management includes a bad-block management, a wear leveling, and a garbage collection operation.

The garbage collection operation is an operation of creating a free space in the NAND memory 5. During the garbage collection operation, all valid data in one or more blocks, in which valid data and invalid data are stored are selectively copied to another block (copy destination free block) in order to increase the number of free blocks of the NAND memory 5. Then, the lookup table (LUT) 33 is updated, such that each LBA of the copied valid data is mapped to a correct physical address. The block containing only invalid data is re-categorized as a free block after copying the valid data to another block. As a result, the block can be reused after erasing the data.

The host 2 sends a write command to the SSD 3. The write command includes a logical address (start logical address) of write data (that is, write data to be written) and a transfer length. In the present embodiment, the LBA is used as the logical address, but, in other embodiments, an object ID may be used as the logical address.

The controller 4 of the SSD 3 writes the write data designated by the start logical address and the transfer length designated by the write command into a page of a block of the NAND memory 5. Furthermore, the controller 4 updates the lookup table (LUT) 33 to map the LBA corresponding to the written data to the physical address indicating a physical storage location to which the data are written.

More specifically, the controller 4 allocates one of the free blocks in the NAND memory 5 as a write destination block to write the data from the host 2. The write destination block is a block to which the data from the host 2 is written, and called "write target block" or "input block". The controller 4 writes the write data received from the host 2 into an available page in the write destination block while updating the lookup table (LUT) 33 irrespective of the LBA of the write data received from the host 2. In a case where there is no available page in the write destination block, the controller 4 allocates a new free block as the write destination block.

Next, the description will be made about a configuration of the controller 4.

The controller 4 includes a host interface 11, a CPU 12, the NAND interface 13, and a DRAM interface 14. The CPU 12, the NAND interface 13, and the DRAM interface 14 are mutually connected through a bus 10.

The host interface 11 receives various commands from the host 2. The commands include, for example, a write command, a read command, and an erase command.

The CPU 12 is a processor which is configured to control the host interface 11, the NAND interface 13, and the DRAM interface 14. The CPU 12 performs physical resource management processing to manage the NAND memory 5, and command processing to process various commands received from the host 2. The physical resource management processing and the command processing may be controlled by firmware executed by the CPU 12.

The firmware causes the CPU 12 to serve as a garbage collection control section 21, a write control section 22, a read control section 23, and a namespace management section 24.

The garbage collection control section 21 controls the garbage collection operation. As described above, the garbage collection operation is an operation of creating the free space in the NAND memory 5. Through the garbage collection operation, all valid data in some blocks storing both valid data and invalid data are selectively copied to the other blocks. The garbage collection control section 21 includes a block select section 211, a data copy control section 212, and an accumulated invalid data count measurement section 213.

The block select section 211 selects a target block of the garbage collection from a number of blocks in the NAND memory 5.

The data copy control section 212 performs a data copy operation during the garbage collection. The data copy control section 212 controls an operation of copying the valid data in the target block of the garbage collection to a copy destination block for the garbage collection. The copy destination block for the garbage collection is also called a write destination block for the garbage collection.

The accumulated invalid data count measurement section 213 counts up the number of invalid data portions found out during the garbage collection operation to calculate the number of accumulated invalid data portions. The number of invalid data portions may be measured (counted) in units of the management size (for example, 4 KB as described above). The number of accumulated invalid data indicates the number (total number) of invalid data portions found out during the garbage collection operation. Furthermore, the accumulated invalid data count measurement section 213 decreases the number of accumulated invalid data by the number of write data portions received from the host 2. In other words, when a write request is received from the host 2, the accumulated invalid data count measurement section 213 subtracts the number corresponding to the data size of the write data designated by the write request from the number of accumulated invalid data portions. For example, when the write request to write 16 KB of write data is received, i.e., four write data portions (4×4 KB) are received, "4" is subtracted from the number of accumulated invalid data portions.

The write control section 22 controls a write operation according to the write request (write command) from the host 2. The write control section 22 allows a reception of the write data portion from the host 2 within the range of the number of accumulated invalid data. In other words, the write control section 22 can receive the write data portions as many as the upper limit (the number of accumulated invalid data portions) from the host 2. The write control section 22 writes the received write data portion in the write destination block of the host 2.

The read control section 23 controls a read operation according to a read request (read command) from the host 2. The read control section 23 reads, for example, the data at LBA designated by the read request from the NAND memory 5, and transmits the read data to the host 2.

The namespace management section 24 manages a plurality of logical address spaces (LBA spaces) corresponding to a plurality of namespaces in order to handle the SSD 3 as if there are a plurality of drives. A designated number of blocks are allocated (reserved) in each namespace. The number of allocated blocks may be different in every namespace. The namespace management section 24 logically divides the NAND memory 5 into a plurality of areas associated with the plurality of namespaces. For example, in a case where a first namespace and a second namespace are created, the namespace management section 24 logically divides the NAND memory 5 into a first area for writing write data portions associated with the first namespace and a second area for writing write data portions associated with the second namespace.

The write data (that is, each write data portion associated with the first namespace) designated by the write request associated with an identifier (NSID #1) of the first namespace are written in a block allocated as the write destination block in the first area (first namespace). When the write destination block is full of data, a new block is allocated as a new write destination block in the first area (first namespace).

The write data (that is, each write data portion associated with the second namespace) designated by the write request associated with an identifier (NSID #2) of the second namespace are written in a block allocated as the write destination block in the second area (second namespace). When the write destination block is full of data, a new block is allocated as a new write destination block in the second area (second namespace).

Figure 2:
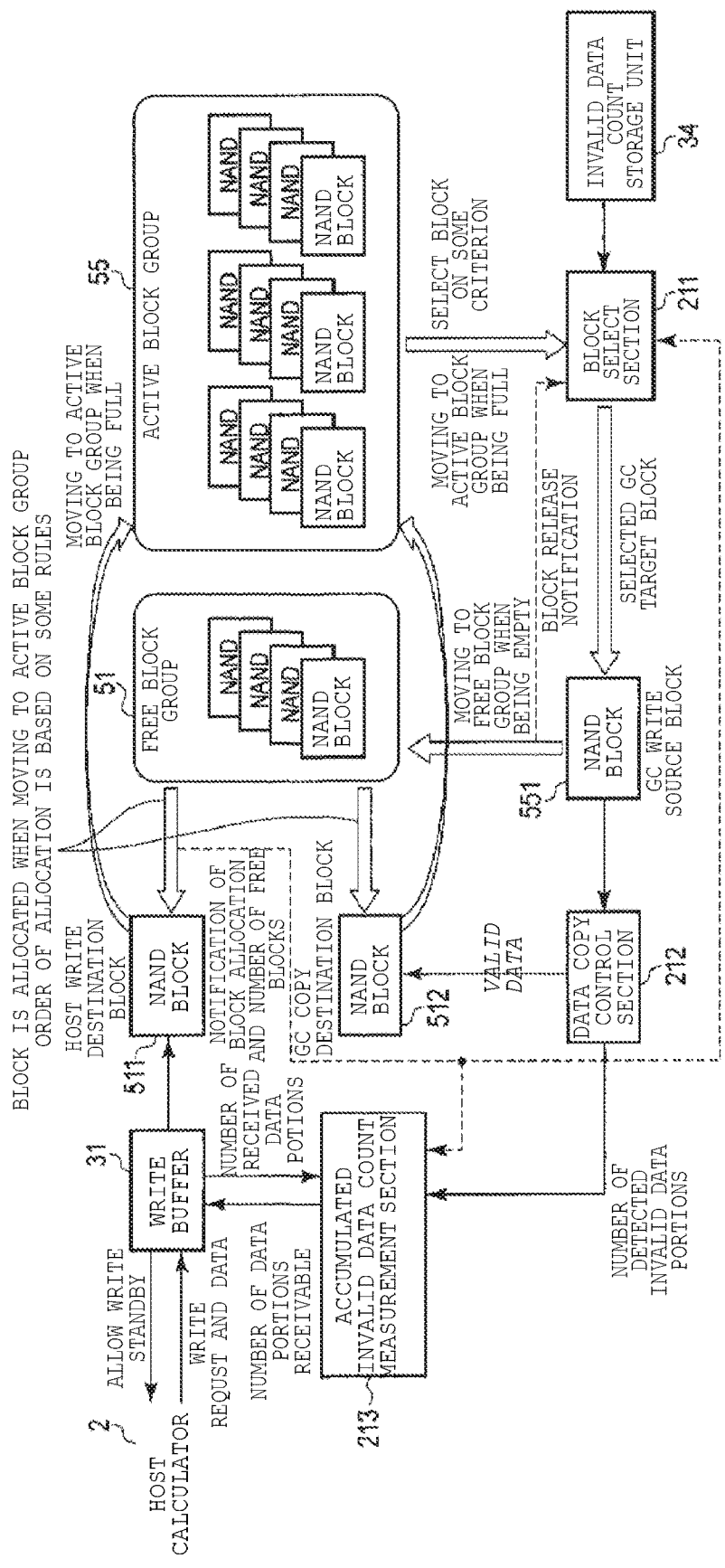
FIG. 2 illustrates a data write operation and a garbage collection operation carried out in the memory system according to the embodiment.

With reference to FIG. 2, the garbage collection operation carried out by the garbage collection control section 21 and the write operation carried out by the write control section 22 will be described.

First, the description will be made about the garbage collection operation.

The block select section 211 selects a target block 551 (hereinafter, also referred to as GC target block) of the garbage collection from an active block group 55. In the active block group 55, a block in use (that is, an active block) is contained. The active block is a block which contains the data from the host 2. An invalid data count storage unit 34 may store the number of invalid data stored in each block. The block select section 211 may select a block having a high rate of invalid data as the target block 551 of the garbage collection with reference to the invalid data count storage unit 34.

The data copy control section 212 sequentially selects the data portion in the GC target block 551. The data copy control section 212 determines whether the selected data portion is valid or invalid each time a certain data portion is selected. The invalid data are data which is no longer used (that is, data not associated with any LBA). The valid data are data in use (that is, data associated with an LBA). In a case where the selected data portion is valid, the data copy control section 212 temporally writes the data portion in a GC buffer 32. In a case where the selected data portion is invalid, the data copy control section 212 skips writing the data portion in the GC buffer 32. Furthermore, the accumulated invalid data count measurement section 213 adds "1" to the number of accumulated invalid data portions each time it is determined that the selected data portion is invalid by the data copy control section 212.

The data copy control section 212 writes the data written in the GC buffer 32, for example, page by page in a copy destination block 512 (hereinafter, also referred to as GC copy destination block) of the garbage collection. The GC copy destination block 512 is a block which is allocated from a free block group 51. The free block group 51 includes a block which is not currently used (that is, a free block). In a case where the GC copy destination block is not yet allocated, the data copy control section 212 allocates one free block in the free block group 51 as a new GC copy destination block 512. In a case where the data is written up to the end of the allocated GC copy destination block 512, the data copy control section 212 re-categorizes the GC copy destination block 512 to the active block group 55.

In a case where all valid data portions in the GC target block 551 are written (copied) in the GC copy destination block 512, the data copy control section 212 re-categorizes the GC target block 551 to the free block group 51. The data copy control section 212 may notify the block select section 211 of the fact that the GC target block 551 is re-categorized as a free block. The block select section 211 may select a new GC target block as needed.

Next, the description will be made about the write operation according to the write request from the host 2.

The write control section 22 receives the write request from the host 2. The write request includes information (transfer length) for designating a data size of the data to be written. The write control section 22 allows a reception of the write data portion from the host 2 within the range of the number of accumulated invalid data. For example, if the current number of accumulated invalid data is "4", the write control section 22 can receive four write data portions (16 KB write data=4×4 KB) in maximum. For that reason, in a case where the number of data portions corresponding to the data size designated by the write request is equal to or less than the number of accumulated invalid data portions, the write control section 22 determines that the write data of the data size designated by the write request is receivable, and returns a response to the host 2.

Since the response shows that the writing is allowed, the host 2 transmits the write data to the SSD 3 according to the response.

The write control section 22 receives the respective write data portions from the host 2, and temporally writes the received write data portions in a write buffer 31. The accumulated invalid data count measurement section 213 subtracts the number of the received write data portions from the number of accumulated invalid data portions, i.e., decrease the number of accumulated invalid data portions by the number of write data portions received from the host 2. The write control section 22 writes the respective write data portions written in the write buffer 31 into a write destination block 511 for the host 2 in units of a page, for example.

The write control section 22 allocates one free block in the free block group 51 as a new write destination block 511 in a case where the write destination block 511 of the host 2 is not yet allocated, in a case where the data are written up to the end of the allocated write destination block 511, or in a case where an error occurs in the write destination block 511. In the case where the data are written up to the end of the allocated write destination block 511, the write control section 22 re-categorizes the write destination block 511 as an active block in the active block group 55.

The accumulated invalid data count measurement section 213 determines whether the number of free blocks remaining in the free block group 51 is equal to or more than a threshold when the write destination block 511 of the host 2 is newly allocated. In a case where the number of remaining blocks is equal to or more than the threshold, the accumulated invalid data count measurement section 213 adds the number of data portions writable to the newly-allocated write destination block 511 to the number of accumulated invalid data portions. The number of data portions writable to the write destination block 511 is the number of data portions corresponding to the capacity of the blocks. Furthermore, in a case where there is a currently-accumulated data portion in the write buffer 31, the accumulated invalid data count measurement section 213 may subtract the number of data portions from the number of accumulated invalid data portions. In a case where the number of remaining free blocks in the free block group 51 is less than the threshold, the accumulated invalid data count measurement section 213 sets the number of accumulated invalid data portions to "0". Furthermore, in a case where there is a currently-accumulated data portion in the write buffer 31, the accumulated invalid data count measurement section 213 may subtract the number of data portions from the number of accumulated invalid data portions.

In a case where it is not possible to receive the write data of the data size designated by the write request, the write control section 22 does not return a response to the host 2 until the write data become receivable. In a case where the number of data portions corresponding to the data size designated by the write request exceeds the number of accumulated invalid data portions, the write control section 22 determines that the write data of the data size designated by the write request are not receivable, and does not return the response to the host 2. Then, in a case where the number of accumulated invalid data portions increased through the garbage collection operation described above becomes equal to or more than the number of data portions corresponding to the data size designated by the write request, the write control section 22 determines that the write data of the data size designated by the write request are receivable, and returns the response to the host 2.

Figure 3:
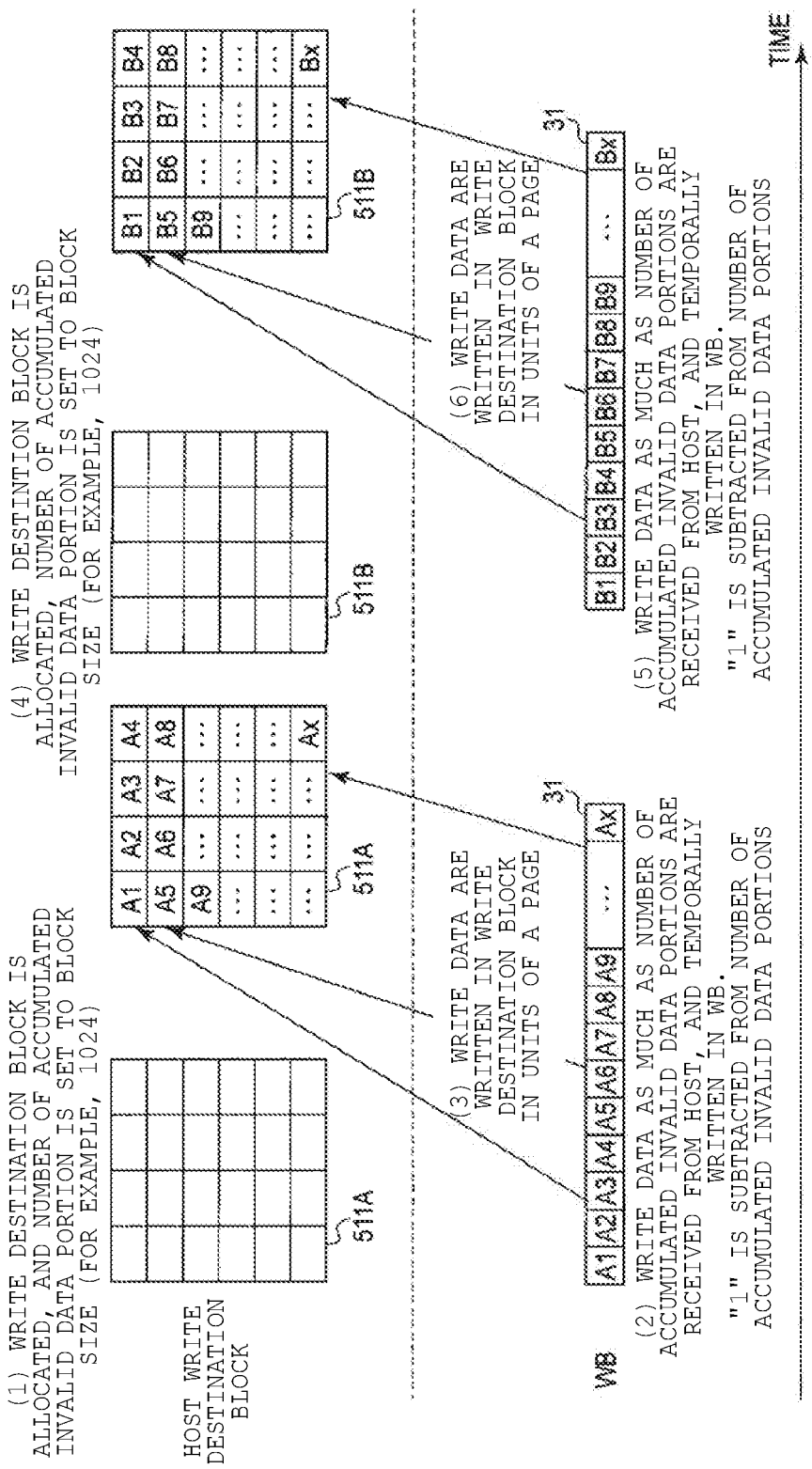
FIG. 3 illustrates an example of a data flow during the data write operation of FIG. 2.

The description will be made with reference to FIG. 3 about a data flow on the NAND memory 5 and the write buffer 31 in a case where a data write operation is performed. Herein, it is assumed that the free blocks equal to or more than the threshold are remaining in the free block group 51.

(1) First, a write destination block 511A of the host 2 is allocated from the free block group 51, and the number of data portions corresponding to the block size of the write destination block 511A is set to the number of accumulated invalid data portions. For example, in a case where a management size is 4 KB, a page size is 16 KB, and the number of pages per block is 256, the number of data portions corresponding to the block size is 1024 (=16 KB÷4 KB×256) for example.

(2) The write data portions A1, A2, . . . , Ax as many as the number of accumulated invalid data portions are received from the host 2, and the write data portions A1, A2, . . . , Ax are temporally written in the write buffer 31. At that time, the number of accumulated invalid data portions is subtracted by "1" for each write data portion.

(3) The write data portions A1, A2, . . . , Ax in the write buffer 31 are written in the write destination block 511A in units of a page.

(4) In a case where the data are written up to the end of the write destination block 511A, a new write destination block 511B is allocated from the free block group 51. Then, the number of data portions (for example, 1024) corresponding to the block size is set to the number of accumulated invalid data portions.

(5) Next, the write data portions B1, B2, . . . , Bx as many as the number of accumulated invalid data portions are received from the host 2, and the write data portions B1, B2, . . . , Bx are temporally written in the write buffer 31. At that time, the number of accumulated invalid data portions is decreased by "1" for each write data portion.

(6) The write data portions B1, B2, . . . , Bx in the write buffer 31 are written in the write destination block 511B in units of a page.

In this way, during a period when the free blocks equal to or more than the threshold are contained in the free block group 51, the allocation of the write destination block of the host 2 and the writing of the data to the block are repeatedly performed.

Figure 4:
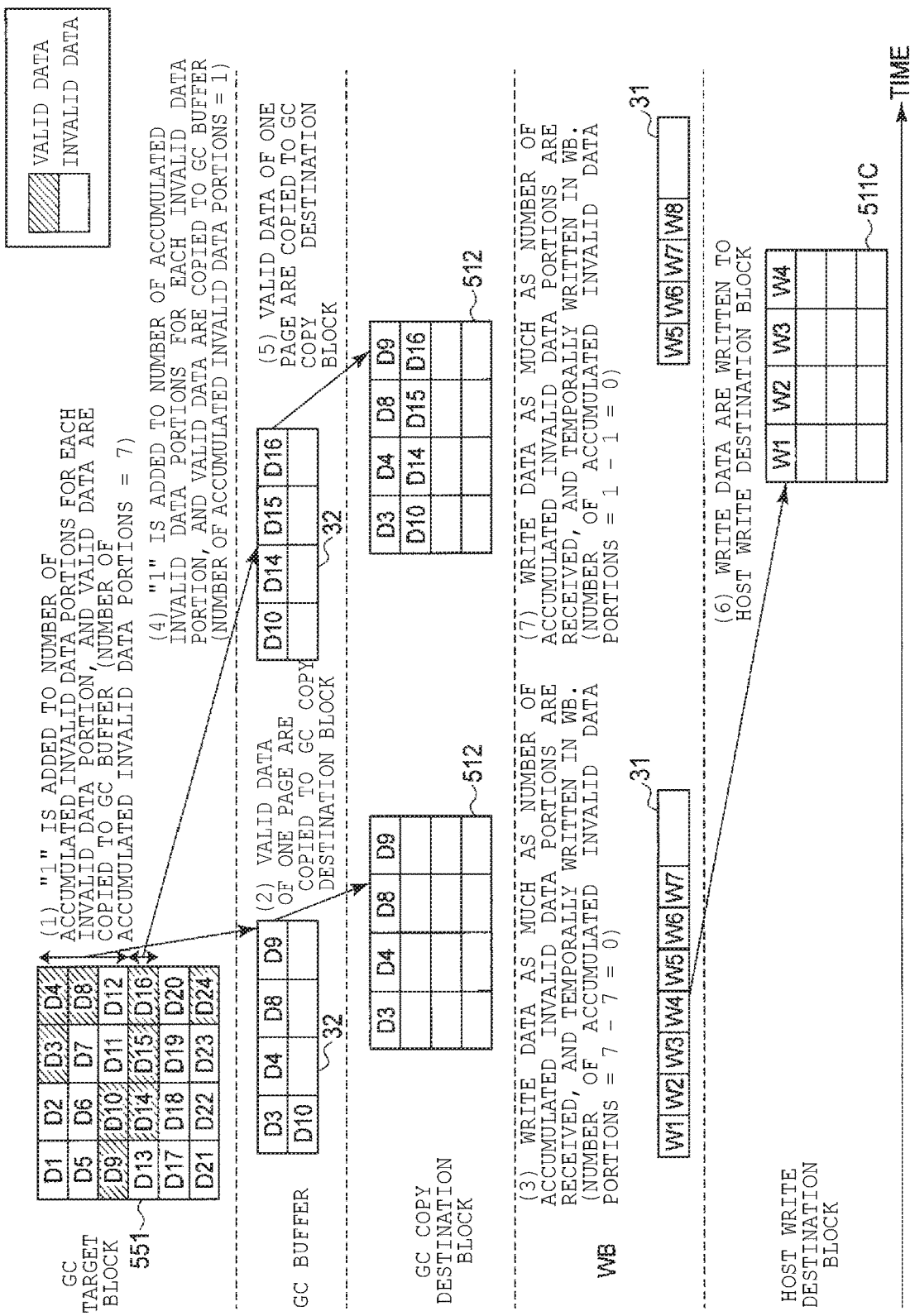
FIG. 4 illustrates an example of a data flow during the data write operation and the garbage collection operation of FIG. 2.

Next, the description will be made with reference to FIG. 4 about a data flow on the NAND memory 5, the write buffer 31, and the GC buffer 32 in a case where the garbage collection operation and the data write operation are concurrently performed. Herein, it is assumed that the free blocks less than the threshold are remaining in the free block group 51.

(1) First, unprocessed data portions are sequentially selected from the head of the target block 551 of the garbage collection. In a case where a certain data portion is selected, it is determined whether the selected data portion is valid or invalid. In a case where the data portion is invalid, the number of accumulated invalid data portions is incremented by "1". In a case where the data portion is valid, the data portion is copied to the GC buffer 32.

For example, in a case where four data portions D1, D2, D3, and D4 on a first page are invalid data, invalid data, valid data, and valid data, respectively, the number of accumulated invalid data portion is incremented by "1" for the invalid data portion D1. Similarly, the number of accumulated invalid data portions is incremented by "1" for the invalid data portion D2. Then, the valid data portions D3 and D4 are copied to the GC buffer 32. In practice, since data reading is performed in units of a page, four data portions D1, D2, D3, and D4 are read out at the same time. Only the valid data portions D3 and D4 in these data portions may be accumulated in the GC buffer 32. In a case where four data portions D5, D6, D7, and D8 on a second page are invalid data, invalid data, invalid data, and valid data, respectively, the number of accumulated invalid data portions is incremented by "1" for the invalid data portion D5. Similarly, the number of accumulated invalid data portions is incremented by "1" for the invalid data portion D6. The number of accumulated invalid data portions is incremented by "1" for the invalid data portion D7. The valid data D8 is copied to the GC buffer 32. As described above, since the data reading is performed in units of a page, four data portions D5, D6, D7, and D8 are read out at the same time. Only the valid data portion D8 in these data portions may be accumulated in the GC buffer 32. In a case where four data portions D9, D10, D11, and D12 on a third page are valid data, valid data, invalid data, and invalid data, respectively, the valid data portions D9 and D10 are copied to the GC buffer 32. The number of accumulated invalid data portions is incremented by "1" for the invalid data D11. Similarly, the number of accumulated invalid data portions is incremented by "1" for the invalid data D12. As described above, since the data reading is performed in units of a page, four data portions D9, D10, D11, and D12 are read out at the same time. Only the valid data portions D9 and D10 in these data portions may be accumulated in the GC buffer 32.

As described above, the data are processed from the first page to the third page, and the valid data portions D3, D4, D8, D9 and D10 equal to or more than one page size are accumulated in the GC buffer 32. The number of accumulated invalid data portions becomes "7".

(2) The valid data portions D3, D4, D8, and D9 as many as one page in the valid data portions D3, D4, D8, D9, and D10 accumulated in the GC buffer 32 are copied to the copy destination block 512 of the garbage collection. In this viewpoint, the garbage collection operation may be temporally stopped, and the data write operation may be performed in the meantime.

(3) During the data write operation, the write data portion is allowed to be received within the range of the number of accumulated invalid data portions. For example, the write data portions W1, W2, . . . , W7 as many as the number of accumulated invalid data portions are receivable from the host 2. The write data portions W1, W2, . . . , W7 are temporally written in the write buffer 31. At that time, the number of accumulated invalid data portions is decreased by "1" for each write data portion that is received. Therefore, when seven write data portions W1, W2, . . . , W7 are received and then the number of accumulated invalid data portions would become "0".

In a case where the number of accumulated invalid data portion becomes "0", new write data are not received from the host 2. For example, at this time point, the write operation may be temporally stopped, and the garbage collection operation may be resumed.

(4) In the subsequent garbage collection operation, four data portions D13, D14, D15, and D16 on a fourth page are invalid data, valid data, valid data, and valid data, respectively, the number of accumulated invalid data portions is incremented by "1" for the invalid data portion D13. The valid data portions D14, D15, and D16 are copied to the GC buffer 32. As described above, since the data reading is performed in units of a page, four data portions D13, D14, D15, and D16 are read out at the same time. Only the valid data portions D14, D15, and D16 in these data portions may be accumulated in the GC buffer 32.

As a result, the valid data portions D10, D14, D15, and D16 equal to or more than one page size are accumulated in the GC buffer 32. The number of accumulated invalid data portions becomes "1".

(5) The valid data portions D10, D14, D15, and D16 as many as one page accumulated in the GC buffer 32 are copied to the copy destination block 512 of the garbage collection. In this viewpoint, the garbage collection operation may be temporally stopped, and the data write operation may be performed in the meantime.

(6) During the data write operation, the write data portions W1, W2, W3, and W4 as many as one page in the write buffer 31 are written in a write destination block 511C.

(7) The write data portion W8 as many as the number of accumulated invalid data portions is received from the host 2. The write data portion W8 is temporally written in the write buffer 31. The number of accumulated invalid data portions is decreased by "1" for the write data portion W8. Therefore, after one write data portion W8 is received, the number of accumulated invalid data portion becomes "0". For example, at this time point, the write operation may be temporally stopped, or the garbage collection operation may be resumed.

The description will be made with reference to the flowcharts of FIGS. 5 and 6 about an exemplary procedure of a write process which is performed by the SSD 3.

Figure 5:
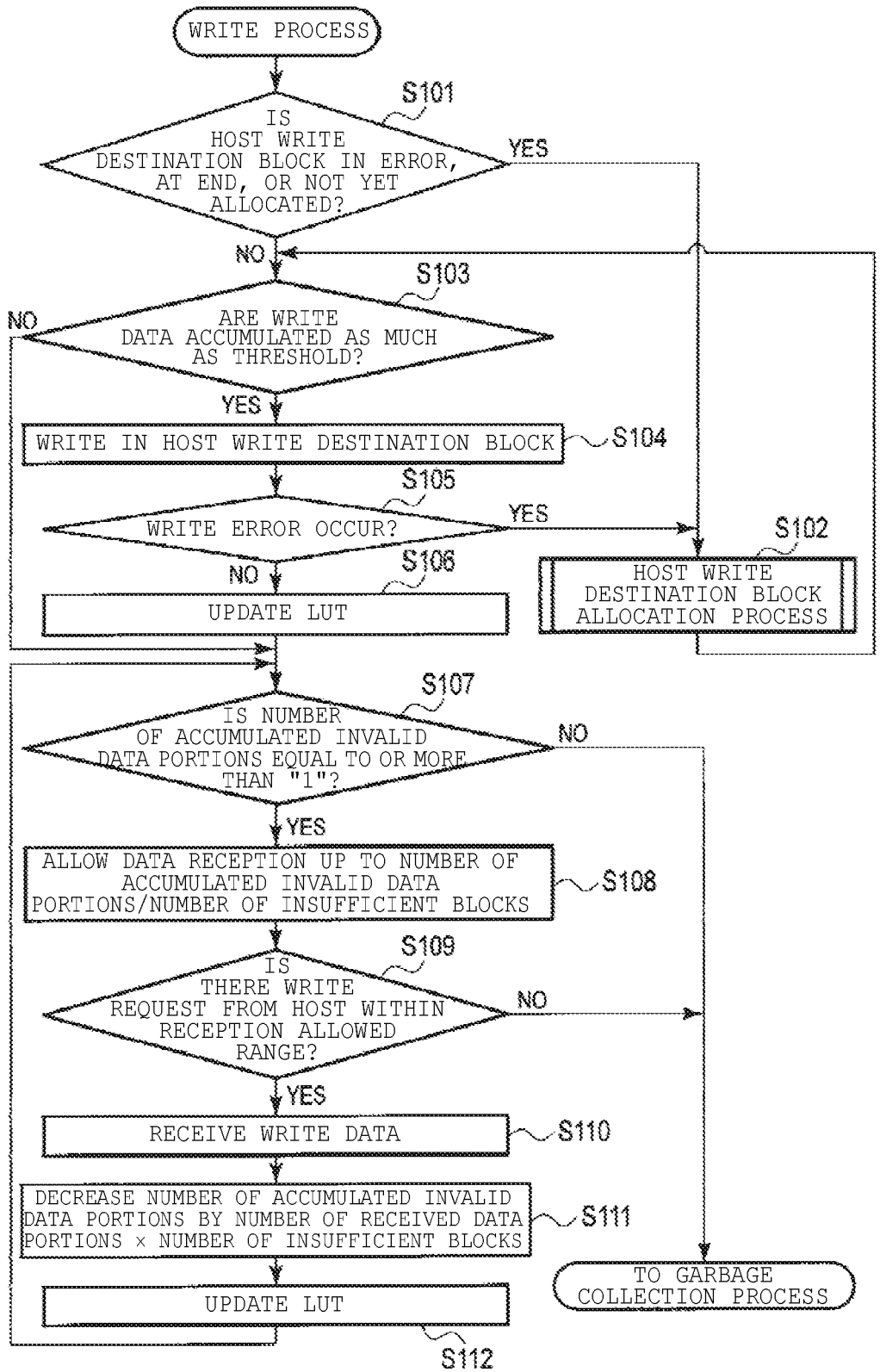
FIG. 5 is a flowchart of a write process performed by the memory system according to the embodiment.
Figure 6:
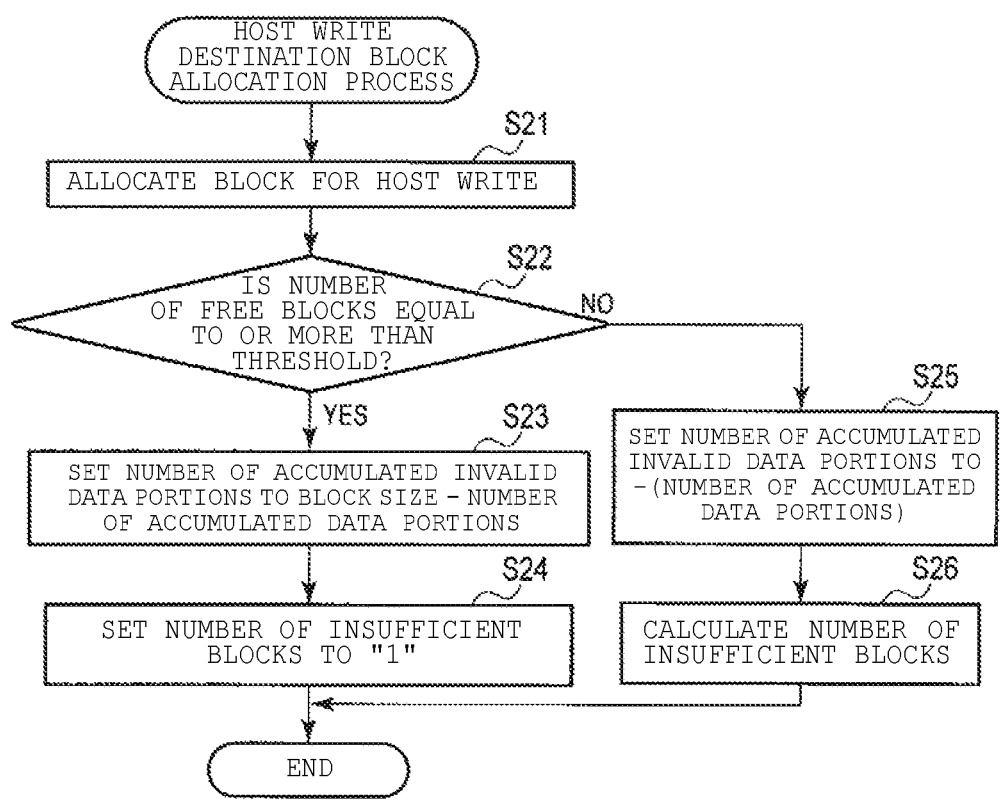
FIG. 6 is a flowchart of a host write destination block allocation process performed by the memory system according to the embodiment.

As illustrated in the flowchart of FIG. 5, first, the controller 4 of the SSD 3 determines a state of a write destination block, i.e., if the state is any one of a state where an error occurs in the write destination block of the host 2, a state where a writing location is at the end of the write destination block, and a state where the write destination block is not yet allocated (Step S101). In a case where it is one of these three states (YES of Step S101), the controller 4 performs a process of allocating the write destination block of the host 2 (Step S102).

The description will be made about a procedure of a host write destination block allocation process of Step S102 with reference to FIG. 6. First, the controller 4 allocates a free block in the free block group 51 as the write destination block of the host 2 (Step S21). The controller 4 determines whether the number of free blocks remaining in the free block group 51 is equal to or more than the threshold (Step S22). The threshold is a value equal to or more than "1" for example. In a case where the number of free blocks remaining in the free block group 51 is equal to or more than the threshold (YES of Step S22), the controller 4 sets the number of accumulated invalid data with a value obtained by subtracting the number of data portions accumulated in the write buffer 31 from the block size which is the number of data portions corresponding to one block (that is, block size—the number of accumulated data) (Step S23). The controller 4 sets "1" to the number of insufficient blocks (Step S24).

On the other hand, in a case where the number of free blocks remaining in the free block group 51 is less than the threshold (NO of Step S22), the controller 4 sets the number of accumulated invalid data portions with a negative value corresponding to the number of data portions accumulated in the write buffer 31 (that is, —(the number of accumulated data portions)) (Step S25). The controller 4 calculates the number of insufficient blocks (Step S26). The controller 4 calculates, for example, a value obtained by adding "1" to the number of bad blocks as the number of insufficient blocks in consideration of the number of bad blocks which are unusable and the number of blocks which are used next time for the writing of the host 2. For example, when one bad block is newly generated, the number of insufficient blocks is set to "2". When two bad blocks are newly generated at the same time, the number of insufficient blocks is set to "3".

As illustrated in the flowchart of FIG. 5, after the procedure of the host write destination block allocation process of Step S102 is completed, alternatively, in a case where the state of the write destination block is not any one of a state where an error occurs in the write destination block of the host 2, a state where the writing location is at the end of the write destination block, and a state where the write destination block is not yet allocated (NO of Step S101), the controller 4 determines whether the write data from the host 2 are accumulated up to the threshold (Step S103). The write data are, for example, data stored in the write buffer 31. In a case where the write data are accumulated as much as the threshold (that is, a case where the write data portions equal to or more than the threshold are accumulated in the write buffer 31) (YES of Step S103), the controller 4 writes the accumulated data to the write destination block of the host 2 (Step S104). The controller 4 writes, for example, data in units of a page with respect to the write destination block. The controller 4 determines whether an error in writing occurs (Step S105). In a case where an error occurs in writing (YES of Step S105), the controller 4 performs a process of allocating the write destination block of the host 2 (Step S102). The procedure of the host write destination block allocation process is as described above with reference to FIG. 6.

In a case where there is no error in writing (NO of Step S105), the controller 4 updates the LUT 33 according to the written data (Step S106), and the process proceeds to Step S107. The controller 4 maps each LBA corresponding to the written data to each physical address on the NAND memory 5 through the updating of the LUT 33.

In a case where the write data are not accumulated as much as the threshold (NO of Step S103), the process proceeds to Step S107 without the data accumulated in the write buffer 31 being written.

In Step S107, the controller 4 determines whether the number of accumulated invalid data portions is equal to or more than "1". In a case where the number of accumulated invalid data portions is not equal to or more than "1" (NO of Step S107), the controller 4 bypasses the write process, and performs a garbage collection process. The procedure of the garbage collection process will be described with reference to FIG. 7.

In a case where the number of accumulated invalid data portions is equal to or more than "1" (YES of Step S107), the controller 4 allows reception of data from the host 2 up to a value obtained by dividing the number of accumulated invalid data portions by the number of insufficient blocks (Step S108). The decimal numbers of the value obtained by dividing the number of accumulated invalid data portions by the number of insufficient blocks is rounded off. Next, the controller 4 determines whether the host 2 issues a write request (write command) in which the number of data portions (or the amount of data) within the range of reception allowance is designated (Step S109).

In a case where there is no write request to which the number of data portions (or the amount of data) within the range of reception allowance is designated (NO of Step S109), the controller 4 bypasses the write process and performs the garbage collection process. Therefore, for example, the garbage collection process is progressed even in a case where the host 2 is in a host idle state and thus does not issue the write request.

In a case where the host 2 issues the write request to which the number of data portions (or the amount of data) within the range of reception allowance is designated (YES of Step S109), the controller 4 returns a response to the write request from the host 2, and receives the write data from the host 2 (Step S110). The received write data are temporally written in the write buffer 31. The controller 4 subtracts a value obtained by multiplying the number of insufficient blocks and the number of received write data from the number of accumulated invalid data (Step S111). The controller 4 updates the LUT 33 according to the data temporally written in the write buffer 31 (Step S112), and the process proceeds to Step S107. The controller 4 maps the LBA corresponding to the data temporally written in the write buffer 31 to the physical address on the write buffer 31 (that is, the DRAM 6) by updating the LUT 33.

Figure 7:
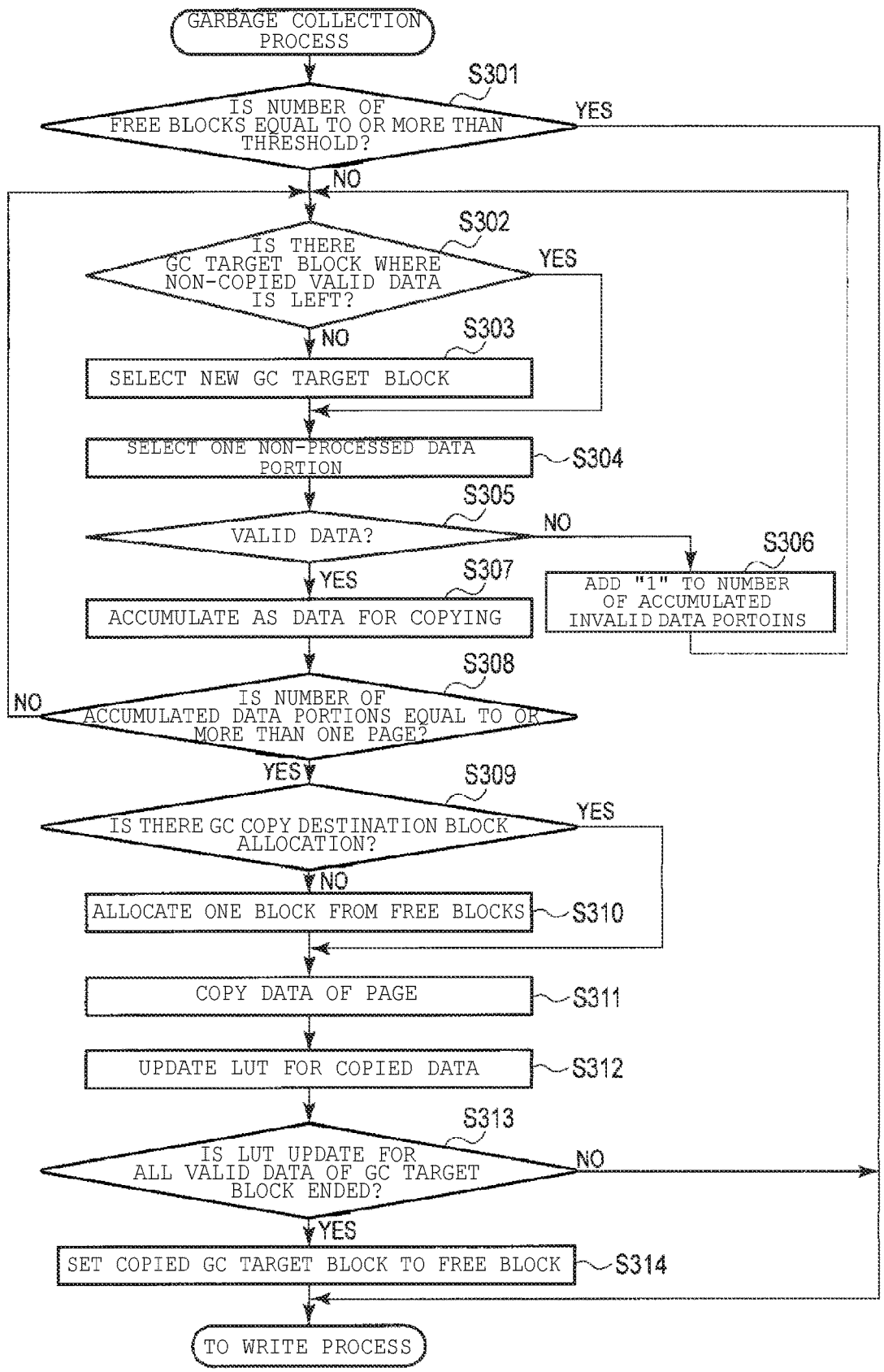
FIG. 7 is a flowchart of a garbage collection process performed by the memory system according to the embodiment.

Next, the description will be made with reference to FIG. 7 about a procedure of the garbage collection process which is performed by the SSD 3.

First, the controller 4 of the SSD 3 determines whether the number of free blocks remaining in the free block group 51 is equal to or more than a threshold (Step S301). The threshold is a value equal to or more than "1" for example. In a case where the number of free blocks remaining in the free block group 51 is equal to or more than the threshold (YES of Step S301), the controller 4 completes the garbage collection process, and performs the write process described above. In a case where the number of free blocks remaining in the free block group 51 is equal to or more than the threshold, the garbage collection process is not performed. As a result, it is possible to prevent the garbage collection process from being excessively performed.

In a case where the number of free blocks remaining in the free block group 51 is less than the threshold (NO of Step S301), the controller 4 determines whether there is a target block of the garbage collection where the non-copied valid data is remaining (Step S302). In a case where there is no target block of the garbage collection where the non-copied valid data is remaining (NO of Step S302), the controller 4 selects a target block of a new garbage collection (Step S303). In a case where there is the target block of the garbage collection where the non-copied valid data is remaining (YES of Step S302), Step S303 is skipped.

Next, the controller 4 selects one piece of unprocessed data from the target block of the garbage collection (Step S304). The selection of data piece is performed in units of minimum data having the same size as the management size (for example, 4 KB). The controller 4 determines whether the unprocessed data portion that is selected is valid or invalid (Step S305). In a case where the unprocessed data portion that is selected is not valid (that is, invalid) (NO of Step S305), the controller 4 adds "1" to the number of accumulated invalid data portions (Step S306).

On the other hand, in a case where the unprocessed data portion that is selected is the valid data (YES of Step S305), the controller 4 accumulates the data portion as the data for copying (Step S307). The controller 4 temporally writes the data portion in a copy buffer 32 for example. The controller 4 determines whether the number of accumulated data portions for copying is equal to or more than the amount of one page (Step S308). In a case where the number of accumulated data portions for copying is less than the amount of one page (NO of Step S308), the process returns to Step S302.

In a case where the number of accumulated data portions for copying is equal to or more than the amount of one page (YES of Step S308), the controller 4 determines whether the copy destination block of the garbage collection is allocated (Step S309). In a case where the copy destination block of the garbage collection is not allocated (NO of Step S309), the controller 4 allocates one free block in the free block group 51 as the copy destination block of the garbage collection (Step S310). In a case where the copy destination block of the garbage collection is already allocated (YES of Step S309), Step S310 is skipped.

The controller 4 copies one page of data among the accumulated data for copying into the copy destination block of the garbage collection (Step S311). The controller 4 updates the LUT 33 corresponding to the copied data (Step S312). The controller 4 maps the LBA corresponding to the copied data to the physical address on the copy destination block by updating the LUT 33.

Next, the controller 4 determines whether the update of the LUT 33 corresponding to all valid data in the target block of the garbage collection is ended (Step S313). In a case where the update of the LUT 33 corresponding to all the valid data is not ended (NO of Step S313), the controller 4 starts the write process. In a case where the update of the LUT 33 corresponding to all valid data is ended (YES of Step S313), the controller 4 sets the copied target block of the garbage collection to be the free block (Step S314), and starts the write process.

As described above, in the present embodiment, the data portions in the target block of the garbage collection are sequentially selected one by one. When the selected data portion is valid, the data portion is copied to the copy destination block of the GC. When the selected data portion is invalid, "1" is added to the number of accumulated invalid data portions. The reception of the write data portion from the host 2 is allowed within the range of the number of accumulated invalid data portions. The number of accumulated invalid data portions is decreased by the number of received write data portions. Therefore, the host write operation and the garbage collection operation can be progressed at the same time only by a simple control of counting the number of invalid data portions which is found out during the garbage collection operation. Therefore, the variation in write latency can be decreased.

The write latency indicates a response time required in writing data. Recently, the amount of data required to be copied for the garbage collection increases as the block size increases. In the present embodiment, a ratio of the host write operation to the garbage collection operation can be controlled in units of data size not in units of a block or a page. In other words, in the present embodiment, the mapping between the LBA and the physical address of the NAND memory 5 is managed in units of the management size using the LUT 33 as an address conversion table. The number of accumulated invalid data portions indicates the number of invalid data portions which are found out during the garbage collection operation in units of the management size. As a result, the write latency can be controlled in units of minimum data size (that is, minimum granularity) such as the management size not in units of a block or a page. The host write operation can be performed at a stable latency.

Since the parameters (for example, overprovisioning size and the like) other than the number of left free blocks and the number of accumulated invalid data are not required, a stable operation can be made even when the size of overprovisioning is dynamically changed.

Furthermore, even in a case where the blocks are different in size, the write latency can be stably controlled in units of the minimum data size (that is, minimum granularity) such as the management size, for example.

Figure 8:
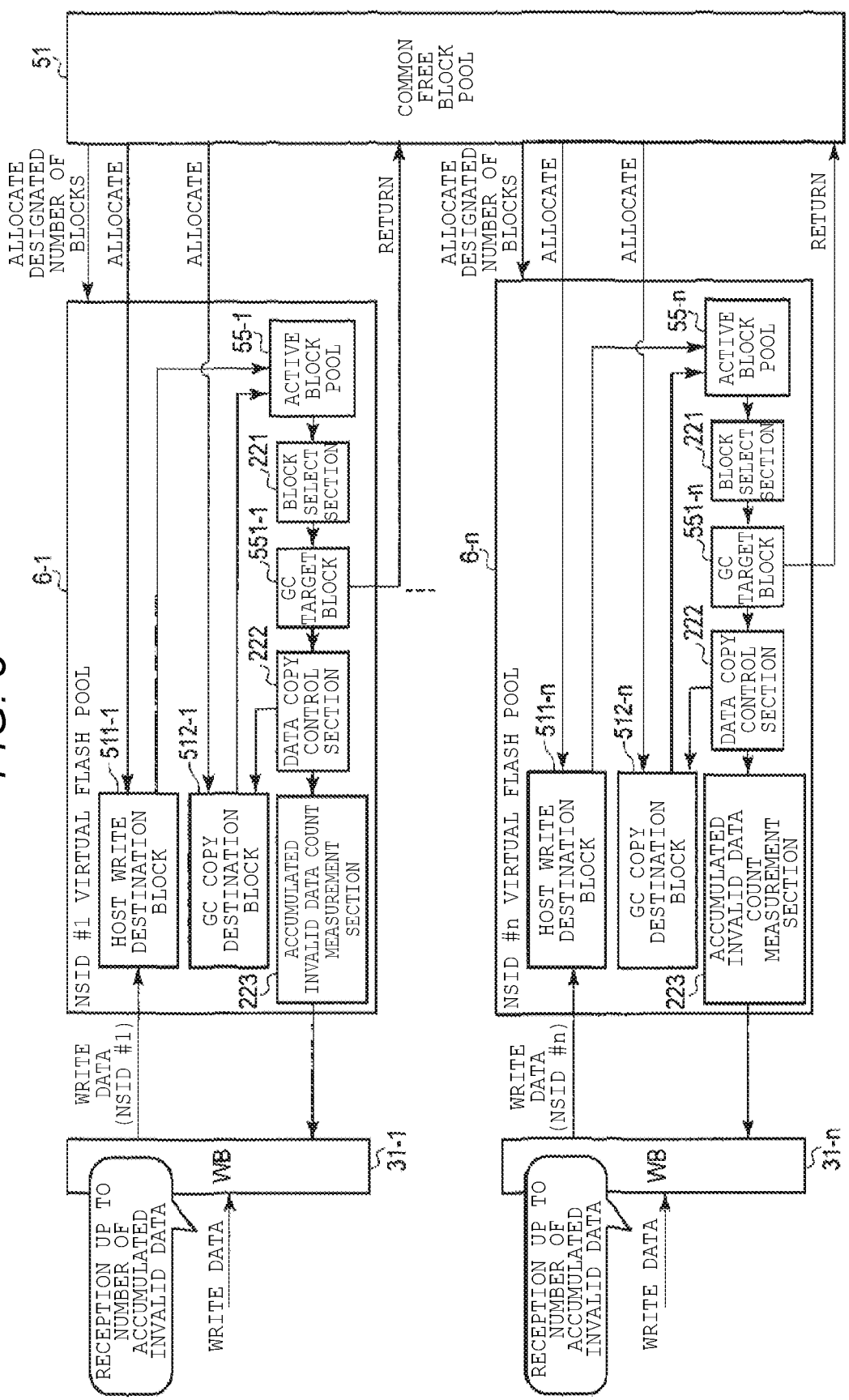
FIG. 8 illustrates an example of the data write operation and the garbage collection operation carried out in parallel for a plurality of namespace functions.

FIG. 8 illustrates an example of the data write operation and the garbage collection operation that are concurrently carried out in a case where the SSD 3 has a plurality of namespaces managed therein. The namespace management section 24 can manage a plurality of logical address spaces (LBA spaces) corresponding to the plurality of namespaces in order to handle the SSD 3 as a plurality of drives. In the respective namespaces, LBA ranges (LBA0 to LBAn−1) are allocated. The size of the LBA range (that is, the number of LBAs) may vary depending on the namespace. Each LBA range starts from LBA0. A designated number of blocks are allocated for each namespace. The number of allocated blocks may be different depending on the namespaces. The namespace management section 24 may separately manage the mapping between the LBA and the physical address in each namespace using a different LUT for each namespace. For example, in the case of the namespace (first area) of NSID #1, the controller 4 manages the mapping between the LBA of the namespace of NSID #1 and the physical address of the first area in units of the management size using the LUT for the namespace of NSID #1. In the case of the namespace (n-th area) of NSID #n, the controller 4 manages the mapping between the LBA of the namespace of NSID #n and the physical address of the n-th area in units of the management size using the LUT for the namespace of NSID #n.

The free blocks of the NAND memory 5 are managed by a common free block pool 51, and some blocks are allocated to the namespace of NSID #1 from the common free block pool (free block group) 51. These allocated blocks are used to store the data associated with the namespace of NSID #1. In other words, these blocks are allocated to the namespace of NSID #1 as blocks for storing the data associated with the namespace of NSID #1. The namespace of NSID #n is also similarly allocated with the blocks. In this way, the NAND memory 5 is logically divided into a plurality of areas corresponding to the namespaces of NSID #1 to NSID #n.

The SSD 3 includes a separate virtual flash pool for each namespace. A virtual flash pool 6-1 is used for managing a physical resource amount (total number of allocated blocks) allocated (reserved) for the namespace of NSID #1. Similarly, a virtual flash pool 6-n is used for managing a physical resource amount (total number of allocated blocks) allocated (reserved) for the namespace of NSID #n. In this case, there is no need to consider which block should be allocated (reserved), but only the number of allocating (reserving) blocks are managed by each virtual flash pool.

Each free block is managed by the common free block pool 51 which is shared by the plurality of namespaces. A block returned from the virtual flash pool of each namespace is managed by the common free block pool 51.

For each of the plurality of namespaces, the data write operation and the garbage collection operation are performed as described above with reference to FIG. 2.

First, the garbage collection operation for the namespace of NSID #1 will be described.

The block select section 211 selects a target block (GC target block) 551-1 of the garbage collection from an active block pool (active block group) 55-1. The data copy control section 212 sequentially selects the data portions in the GC target block 551-1, and writes the selected data portion in a GC copy destination block 512-1 when the selected data portion is the valid data. When the selected data portion is the invalid data, the accumulated invalid data count measurement section 213 adds "1" to the number of accumulated invalid data of the namespace of NSID #1.

The GC copy destination block 512-1 is a block allocated from the common free block pool 51. In a case where the data are written up to the end of the allocated GC copy destination block 512-1, the data copy control section 212 moves the GC copy destination block 512-1 to the active block pool 55-1.

In a case where all valid data in the GC target block 551-1 are written in the GC copy destination block 512-1, the data copy control section 212 re-categorizes the GC target block 551-1 as a free block in the common free block pool 51.

Next, the write operation according to the write request designating the namespace of NSID #1 from the host 2 will be described.

The write request (write command) containing NSID #1 is sent to the write control section 22 for the namespace of NSID #1. The write control section 22 allows the reception of the write data portion associated with the namespace of NSID #1 within the range of the number of accumulated invalid data portion of the namespace of NSID #1. In other words, the write control section 22 can receive the write data portion associated with the namespace of NSID #1 from the host 2 up to the number of accumulated invalid data portions. The write control section 22 temporally writes the received write data in a write buffer 31-1. The accumulated invalid data count measurement section 213 subtracts the number of write data portions received from the host 2 from the number of accumulated invalid data portions for the namespace of NSID #1. The write control section 22 writes the data written in the write buffer 31-1 into a write destination block 511-1 of the host 2 for the namespace of NSID #1 in units of a page for example.

The write control section 22 allocates one free block in the free block pool 51 as a new write destination block 511-1 in a case where the write destination block 511-1 of the host 2 for the namespace of NSID #1 is not yet allocated, in a case where the data are written up to the end of the allocated write destination block 511-1, or in a case where an error occurs in the write destination block 511-1. In a case where the data are written up to the end of the allocated write destination block 511-1, the write control section 22 re-categorizes the write destination block 511-1 as an active block in the active block pool 55-1.

The accumulated invalid data count measurement section 213 determines whether the number of remaining blocks allocable for the namespace of NSID #1 is equal to or more than the threshold when the write destination block 511-1 of the host 2 is newly allocated. The number of remaining blocks is obtained by subtracting the number of used blocks (the number of blocks which are used for the namespace of NSID #1) from a total number of blocks allocated (reserved) for the namespace of NSID #1. In a case where the number of remaining blocks is equal to or more than the threshold, the accumulated invalid data count measurement section 213 adds the number of data portions writable to the newly-allocated write destination block 511-1 to the number of accumulated invalid data portions for the namespace of NSID #1. The number of data portions writable to the write destination block 511-1 is the number of data portions corresponding to the capacity of the block. Furthermore, in a case where there are the data portions which are currently accumulated in the write buffer 31-1, the accumulated invalid data count measurement section 213 may subtract the number of data portions from the number of accumulated invalid data portions for the namespace of NSID #1. In a case where the number of remaining blocks allocable for the namespace of NSID #1 is less than the threshold, the accumulated invalid data count measurement section 213 sets "0" to the number of accumulated invalid data portions for the namespace of NSID #1. Furthermore, in a case where there are data portions which are currently accumulated in the write buffer 31-1, the accumulated invalid data count measurement section 213 may subtract the number of data portions from the number of accumulated invalid data portions for the namespace of NSID #1.

Similarly, the garbage collection operation for the namespace of NSID #n and the write operation according to the write request for the namespace of NSID #n from the host 2 are performed.

The description will be made with reference to the flowcharts of FIGS. 9 and 10 about an exemplary procedure of the write process performed by the SSD 3 in which a plurality of areas is set for the plurality of namespaces. In the following, the description will be made about the write process to one of the plurality of namespaces in order to help with understanding. The controller 4 can perform the similar write processes in parallel with respect to the plurality of name spaces.

Figure 9:
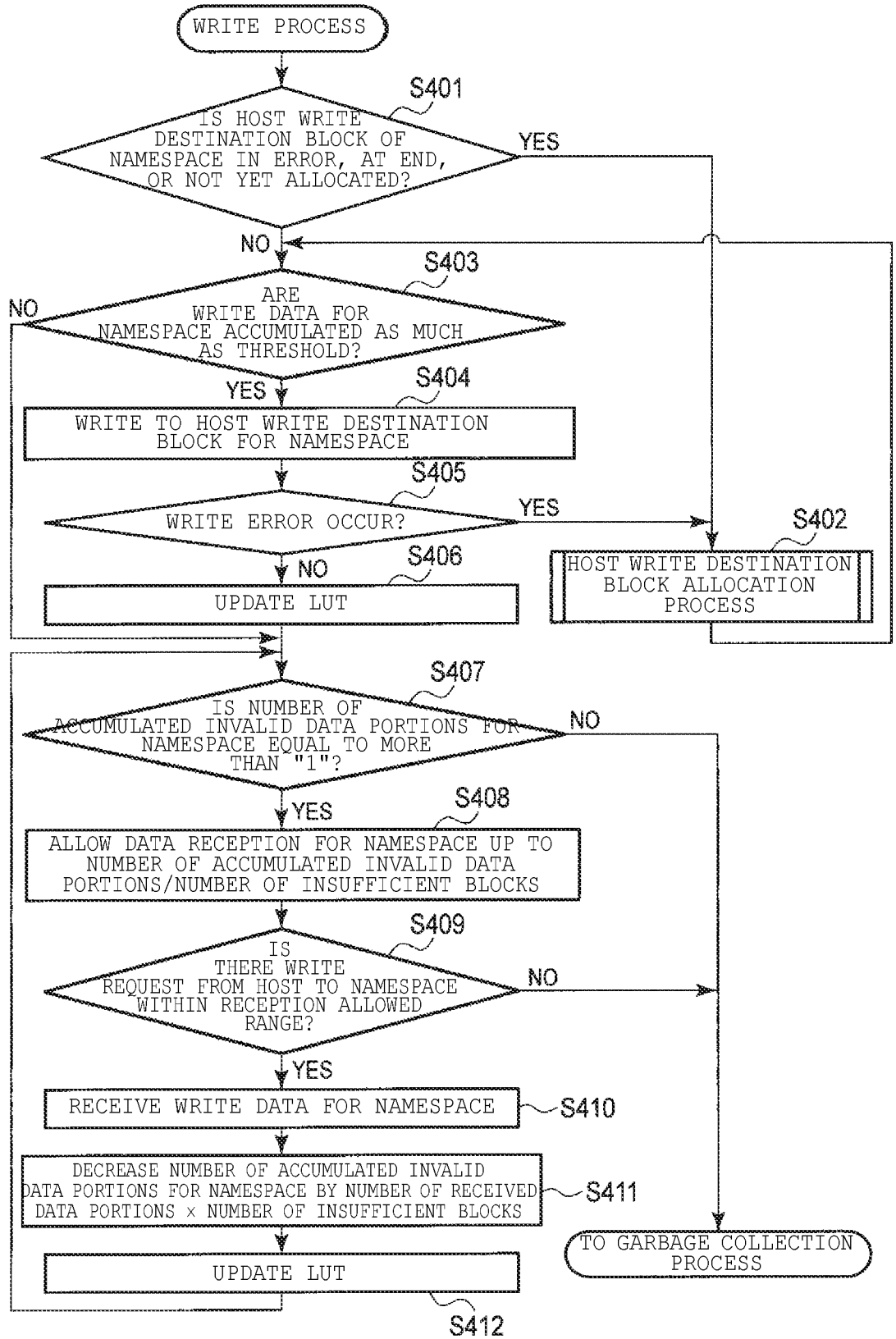
FIG. 9 is a flowchart illustrating another procedure of the write process performed by the memory system according to the embodiment.
Figure 10:
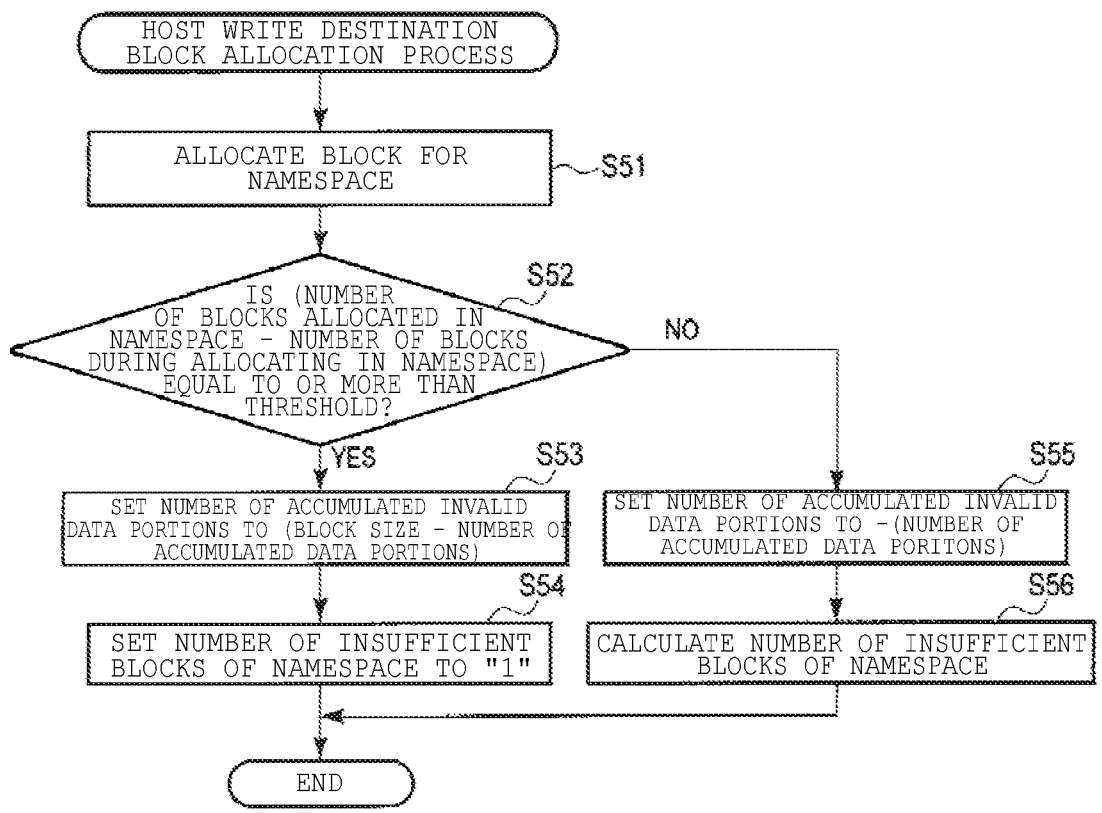
FIG. 10 is a flowchart illustrating another procedure of the host write destination block allocation process performed by the memory system according to the embodiment.

As illustrated in the flowchart of FIG. 9, first, the controller 4 of the SSD 3 determines the state of the write destination block, i.e., if the state is any one of a state where an error occurs in the write destination block from the host 2 to a certain namespace, a state where the writing location is at the end of the write destination block, and a state where the write destination block is not yet allocated (Step S401). In a case where the state is any one of these three states (YES of Step S401), the controller 4 performs a process of allocating the write destination block from the host 2 to the namespace (Step S402).

The procedure of the host write destination block allocation process of Step S402 will be described with reference to FIG. 10. First, the controller 4 allocates the free block in the free block group 51 as the write destination block to the namespace of the host 2 (Step S51). The controller 4 determines whether the number of remaining blocks obtained by subtracting the number of used blocks indicating the number of blocks used in the namespace from a total number of blocks allocated for the namespace is equal to or more than the threshold (Step S52). The threshold is a value equal to or more than "1" for example. In a case where the number of remaining blocks is equal to or more than the threshold (YES of Step S52), the controller 4 sets the number of accumulated invalid data portions for the namespace to a value obtained by subtracting the number of data portions accumulated in the write buffer 31 from the block size (block size—the number of accumulated data portions), that is, the number of data portions corresponding to one block (Step S53). The controller 4 sets "1" to the number of insufficient blocks of the namespace (Step S54).

On the other hand, in a case where the number of free blocks remaining in the free block group 51 is less than the threshold (NO of Step S52), the controller 4 sets the number of accumulated invalid data portions for the namespace to a negative value (that is, —(the number of accumulated data portions)) corresponding to the number of data portions accumulated in the write buffer 31 (Step S55). The controller 4 calculates the number of insufficient blocks of the namespace (Step S56). The controller 4 calculates, for example, a value obtained by adding "1" to the number of bad blocks as the number of insufficient blocks in consideration of the number of bad blocks which are unusable and the number of blocks which are used next time for the writing of the host 2. For example, when one bad block is newly generated, the number of insufficient blocks is set to "2". When two bad blocks are newly generated at the same time, the number of insufficient blocks is set to "3".

As illustrated in the flowchart of FIG. 9, after the procedure of the host write destination block allocation process of Step S402 is completed, or in a case where the state of the write destination block does not correspond to any one of the state where an error occurs in the write destination block of the host 2 in a certain namespace, the state where the writing location is at the end of the write destination block, and the state where the write destination block is not yet allocated (NO of Step S401), the controller 4 determines whether or not the write data from the host 2 to the namespace is accumulated as much as the threshold (Step S403). The write data are, for example, data stored in the write buffer 31. In a case where the write data are accumulated as much as the threshold (that is, a case where the write data portions equal to or more than the threshold are accumulated in the write buffer 31 (YES of Step S403), the controller 4 writes the accumulated data in the write destination block of the host 2 for the namespace (Step S404). The controller 4 writes, for example, data in units of a page with respect to the write destination block. The controller 4 determines whether an error occurs during writing data (Step S405). In a case where an error occurs (YES of Step S405), the controller 4 performs a process of allocating the write destination block of the host 2 (Step S402). The procedure of the host write destination block allocation process is the same as described above with reference to FIG. 10.

In a case where an error does not occur (NO of Step S405), the controller 4 updates the LUT 33 of the namespace according to the written data (Step S406), and the process proceeds to Step S407. The controller 4 maps the LBA corresponding to the data written in the area of the namespace to the physical address on the NAND memory 5 by updating the LUT 33 for the name space.

In a case where the write data are not accumulated as much as the threshold (NO of Step S403), the process of writing the data accumulated in the write buffer 31 is not performed, and the process proceeds to Step S407.

In Step S407, the controller 4 determines whether or not the number of accumulated invalid data portions for the namespace is equal to or more than "1". In a case where the number of accumulated invalid data portions for the namespace is not equal to or more than "1" (NO of Step S407), the controller bypasses the write process and performs the garbage collection process. The procedure of the garbage collection process will be described with reference to FIG. 11.

In a case where the number of accumulated invalid data portions for the namespace is equal to or more than "1" (YES of Step S407), the controller 4 allows reception of data from the host 2 up to a value obtained by dividing the number of accumulated invalid data portions for the namespace by the number of insufficient blocks (Step S408). The decimal numbers of the value obtained by dividing the number of accumulated invalid data portions by the number of insufficient blocks is rounded off. Next, the controller 4 determines whether there is a write request (write command) from the host 2 in which the number of data (or the quantity of data) portions within the range of reception allowance is designated with respect to the namespace (Step S409).

In a case where there is no write request in which the number of data portions (or the quantity of data) within the range of reception allowance is designated with respect to the namespace (NO of Step S409), the controller 4 bypasses the write process and performs the garbage collection process. Therefore, for example, the garbage collection process is progressed even in a case where the host 2 is in a host idle state and thus does not issue the write request.

In a case where there is a write request from the host 2 in which the number of data portions (or the quantity of data) within the range of reception allowance is designated with respect to the namespace (YES of Step S409), the controller 4 returns a response to the write request from the host 2, and receives the write data with respect to the namespace from the host 2 (Step S410). The received write data are temporally written in the write buffer 31 for every namespace. The controller 4 subtracts a value obtained by multiplying the number of insufficient blocks to the number of received write data portions from the number of accumulated invalid data portions for the namespace (Step S411). The controller 4 updates the LUT 33 for the namespace according to the data temporally written in the write buffer 31 (Step S412), and the process proceeds to Step S407. The controller 4 maps the LBA corresponding to the data temporally written in the write buffer 31 to the physical address on the write buffer 31 (that is, the DRAM 6) by updating the LUT 33 of the namespace.

Figure 11:
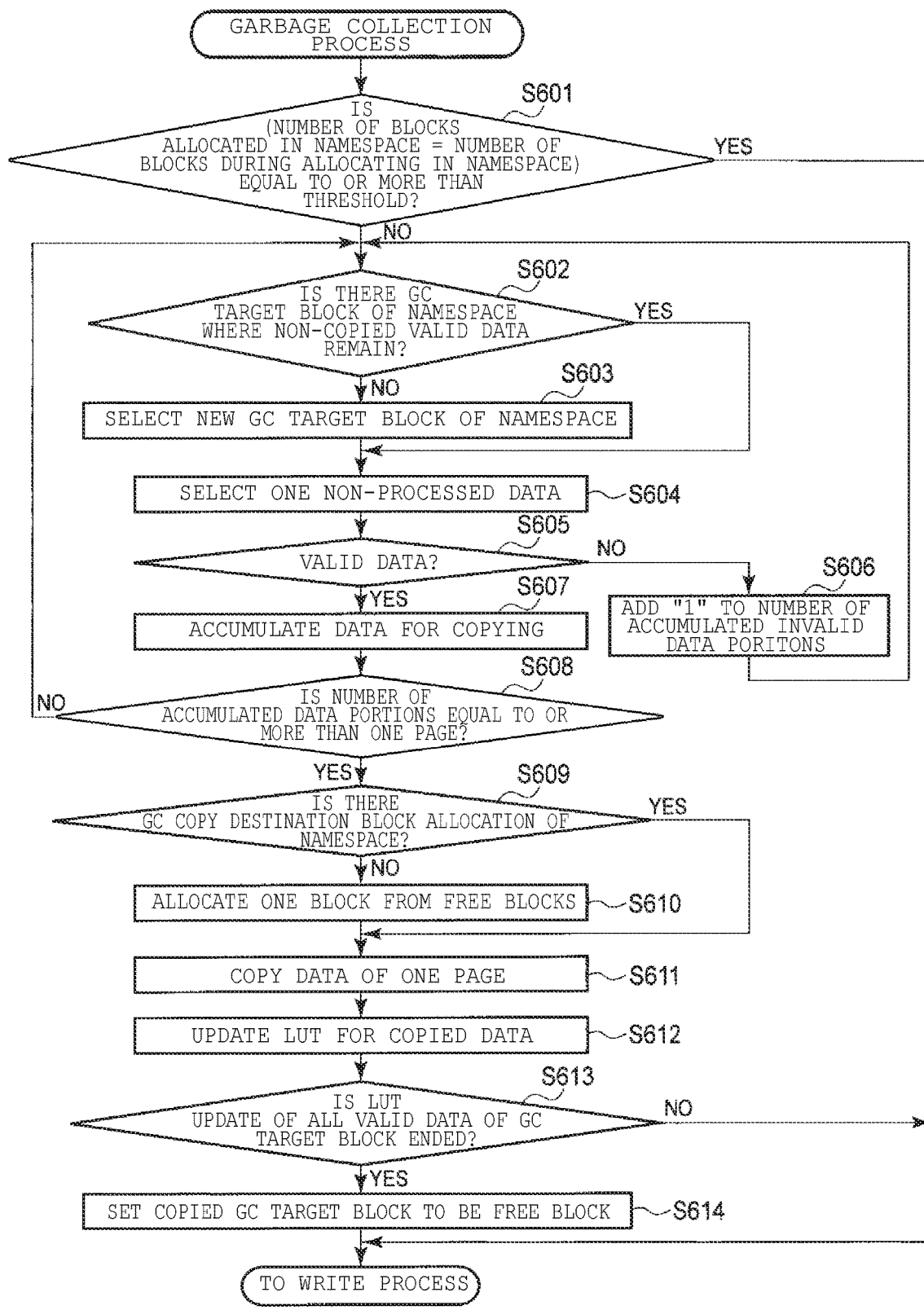
FIG. 11 is a flowchart illustrating another procedure of the garbage collection process performed by the memory system according to the embodiment.

Next, the description will be made with reference to FIG. 11 about an exemplary procedure of the garbage collection process performed by the SSD 3.

First, the controller 4 of the SSD 3 determines whether or not the number of remaining blocks, which is obtained by subtracting the number of used blocks, i.e., the number of blocks used in the namespace, from a total number of blocks allocated for the namespace is equal to or more than the threshold (Step S601). The threshold is a value equal to or more than "1" for example. In a case where the number of remaining blocks is equal to or more than the threshold (YES of Step S601), the controller 4 ends the garbage collection process and performs the write process described above. In a case where the number of remaining blocks is equal to or more than the threshold, the garbage collection process is not performed. As a result, it is possible to prevent the garbage collection process from being excessively performed.

In a case where the number of remaining blocks is less than the threshold (NO of Step S601), the controller 4 determines whether or not there is a target block of the garbage collection for the namespace where non-copied valid data are remaining (Step S602). In a case where there is no target block of the garbage collection for the namespace where the non-copied valid data is remaining (NO of Step S602), the controller 4 selects a target block of a new garbage collection for the namespace (Step S603). In a case where there is a target block of the garbage collection for the namespace where the non-copied valid data is remaining (YES of Step S602), the procedure of Step S603 is skipped.

Next, the controller 4 selects one piece of the non-processed data from the target block of the garbage collection (Step S604). The selection of data is performed in units of a minimum data size that is the same as the management size (for example, 4 KB). The controller 4 determines whether or not the non-processed data portion that is selected is valid or invalid (Step S605). In a case where the non-processed data portion that is selected is not valid (that is, invalid) (NO of Step S605), the controller 4 adds "1" to the number of accumulated invalid data portions for the namespace (Step S606).

On the other hand, in a case where the non-processed data portion that is selected is valid (YES of Step S605), the controller 4 accumulates the data portion as the data for copying (Step S607). The controller 4 temporally writes the data portion in the copy buffer 32 for example. The controller 4 determines whether or not the number of accumulated data portions for copying is equal to or more than one page in the namespace (Step S608). In a case where the number of accumulated data portions for copying is less than one page (NO of Step S608), the process returns to Step S602.

In a case where the number of accumulated data portions for copying is equal to or more than one page (YES of Step S608), the controller 4 determines whether or not the copy destination block of the garbage collection for the namespace is allocated (Step S609). In a case where the copy destination block of the garbage collection is not allocated (NO of Step S609), the controller 4 allocates one free block of the free block group 51 as the copy destination block of the garbage collection for the namespace (Step S610). In a case where the copy destination block of the garbage collection is already allocated (YES of Step S609), the procedure of Step S610 is skipped.

The controller 4 copies data as much as one page among the accumulated data portions for copying to the copy destination block of the garbage collection for the namespace (Step S611). The controller 4 updates the LUT 33 corresponding to the copied data for the namespace (Step S612). The controller 4 maps the LBA corresponding to the copied data to the physical address on the copy destination block in the namespace by updating the LUT 33 for the namespace.

Next, the controller 4 determines whether update of the LUT 33 corresponding to all valid data in the target block of the garbage collection is ended (Step S613). In a case where the update of the LUT 33 corresponding to all valid data is not ended (NO of Step S613), the controller 4 starts the write process. In a case where the update of the LUT 33 corresponding to all valid data is ended (YES of Step S613), the controller 4 sets the copied target block of the garbage collection to the free block (Step S614), and starts the write process.

As described above, also in a case where a plurality of areas is provided for the plurality of namespaces in the SSD 3, the host write operation and the garbage collection operation can be processed at the same time by a simple control of counting the number of invalid data portions found out during the garbage collection operation for each namespace. As a result, it is possible to decrease a variation in write latency.

Figure 12:
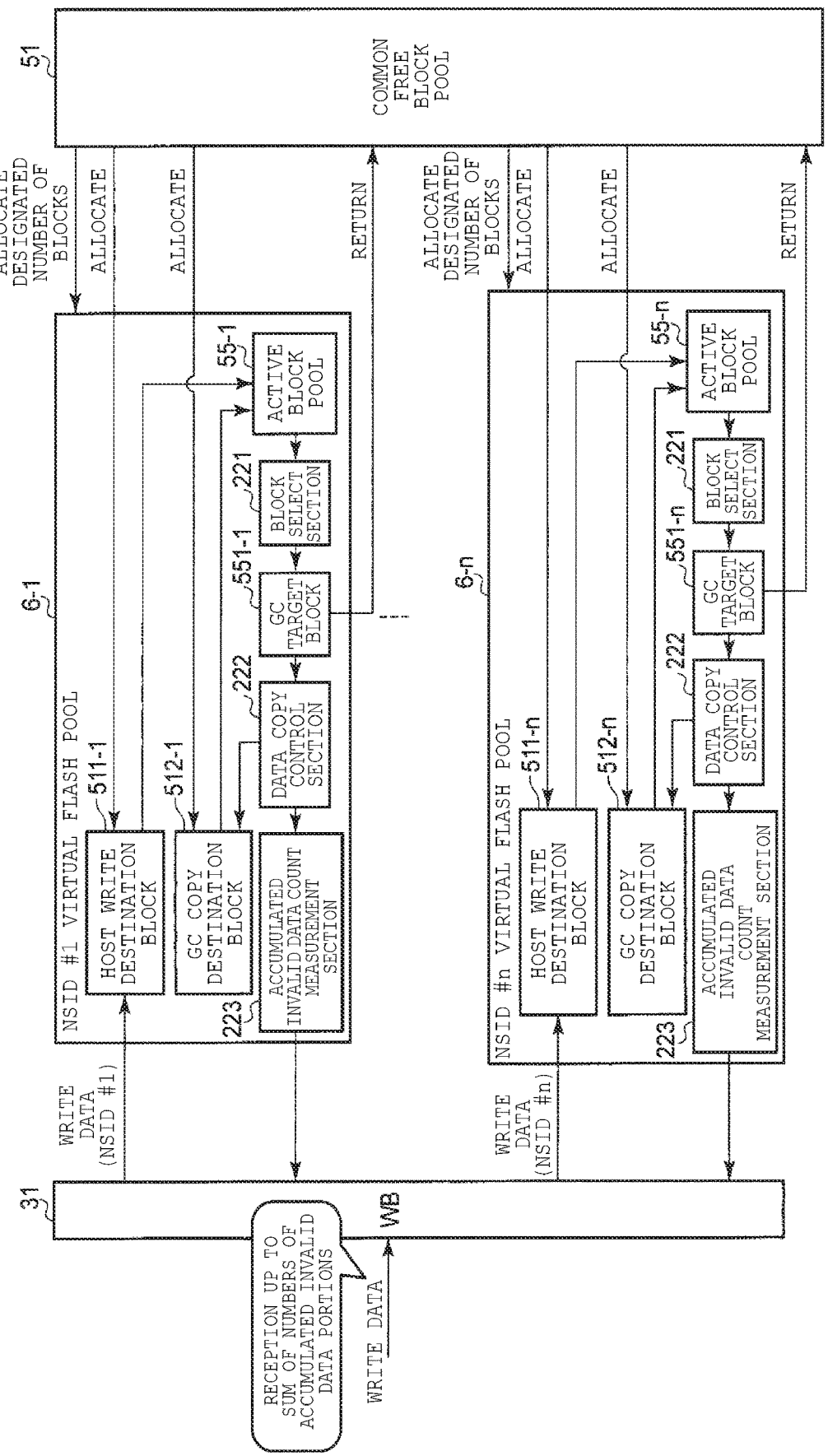
FIG. 12 illustrates another example of the data write operation and the garbage collection operation carried out in parallel for the plurality of namespace functions.

FIG. 12 illustrates another example of the data write operation and the garbage collection operation in a case where the SSD 3 supports the plurality of namespaces. For each of the plurality of namespaces, the garbage collection operation is performed as described above with reference to FIG. 8. That is, the number of accumulated invalid data portions is calculated for each namespace.

In the example illustrated in FIG. 12, the write control section 22 calculates a total sum of the numbers of accumulated invalid data portions for the plurality of namespaces, and allows reception of the write data portion from the host 2 within the range of the calculated total sum. In other words, the write control section 22 can receive the write data portions from the host 2 by the total sum (upper limit) of the numbers of accumulated invalid data portions for the plurality of namespaces. The write control section 22 temporally writes the received write data from the host 2 in the write buffer 31. The accumulated invalid data count measurement section 213 may subtract the number of data portions received from the host 2 from the total sum of the number of accumulated invalid data portions. The write control section 22 writes the data written in the write buffer 31 in the write destination blocks 511-1 to 511-n of the host 2 for the namespace designated by the write request, for example, in units of a page.

In a case where the number of free blocks insufficient in the memory system is equal to or more than two, the write control section 22 may allow reception of the write data portion from the host 2 within the range of a value obtained by dividing the total sum of the numbers of accumulated invalid data portions by the number of insufficient free blocks.

Figure 13:
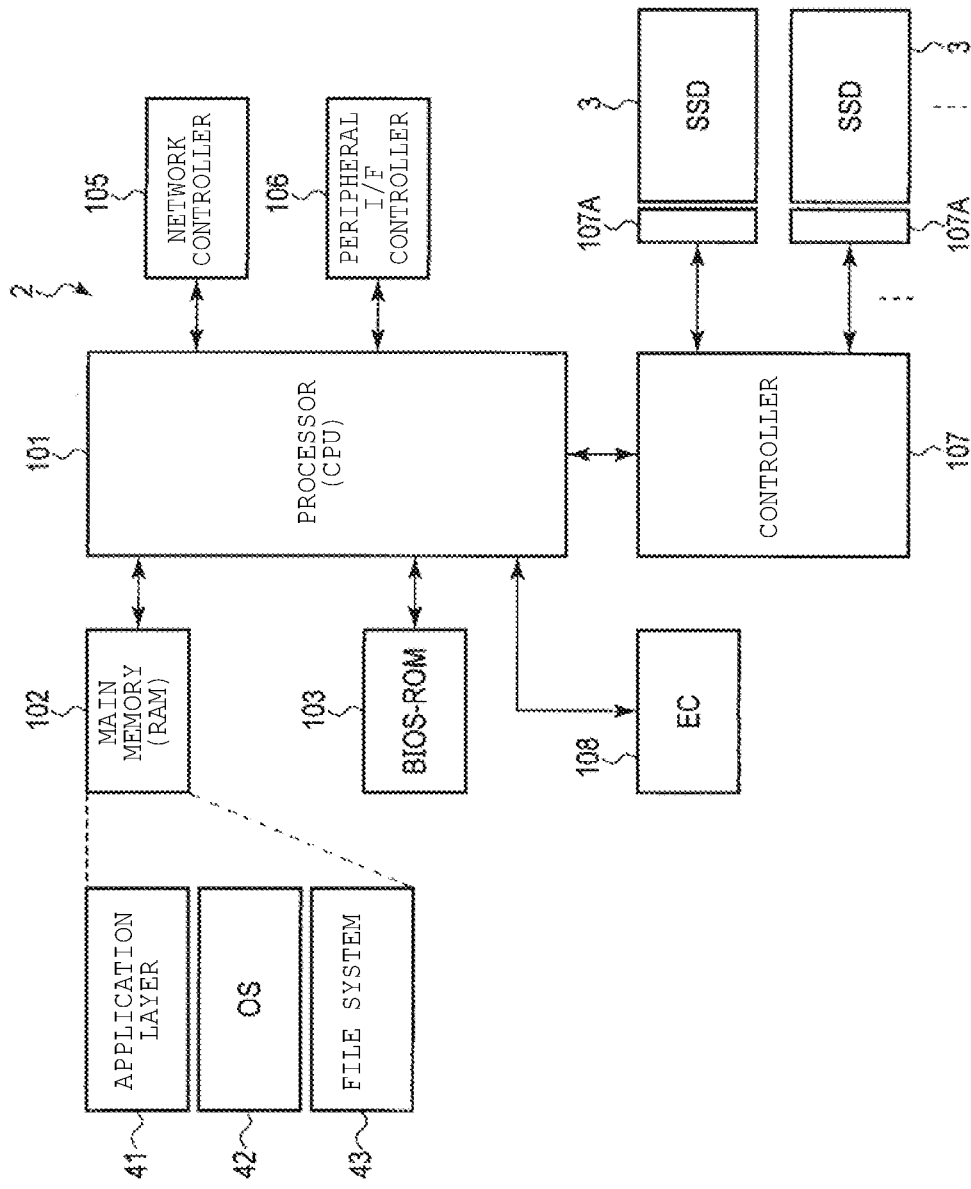
FIG. 13 is a block diagram of a host.

FIG. 13 illustrates an exemplary hardware configuration of the information processing device serving as the host 2.

The information processing device is formed as a server computer or a personal computer. The information processing device includes a processor (CPU) 101, a main memory 102, a BIOS-ROM 103, a network controller 105, a peripheral interface controller 106, a controller 107, an embedded controller (EC) 108, and the like.

The processor 101 is a CPU configured to control operations of the respective components of the information processing device. The processor 101 executes various software programs loaded from any one of the plurality of SSDs 3 to the main memory 102. The main memory 102 is configured with a random access memory such as a DRAM. The software program executed by the processor 101 includes an application software layer 41 described above, an OS 42, and a file system 43.

The processor 101 executes also a basic input/output system (BIOS) stored in the BIOS-ROM (nonvolatile memory) 103. The BIOS is a system program for a hardware control.

The network controller 105 is a communication device such as a wired LAN controller and a wireless LAN controller. The peripheral interface controller 106 is configured to perform communication with the peripheral devices such as a USB device.

The controller 107 is configured to perform the communication with the devices connected to the plurality of connectors 107A. In the present embodiment, the plurality of SSDs 3 are connected to the plurality of connectors 107A. Examples of the controller 107 include an SAS expander, a PCIe Switch, a PCIe expander, a flash array controller, or a RAID controller.

An EC 108 serves as a system controller configured to perform power management of the information processing device. The EC 108 turns on and off the power of the information processing device according to a user's operation on a power switch. The EC 108 is formed as a processing circuit such as a one-chip micro controller. The EC 108 may include a keyboard controller which controls an input device such as a keyboard (KB).

Figure 14:
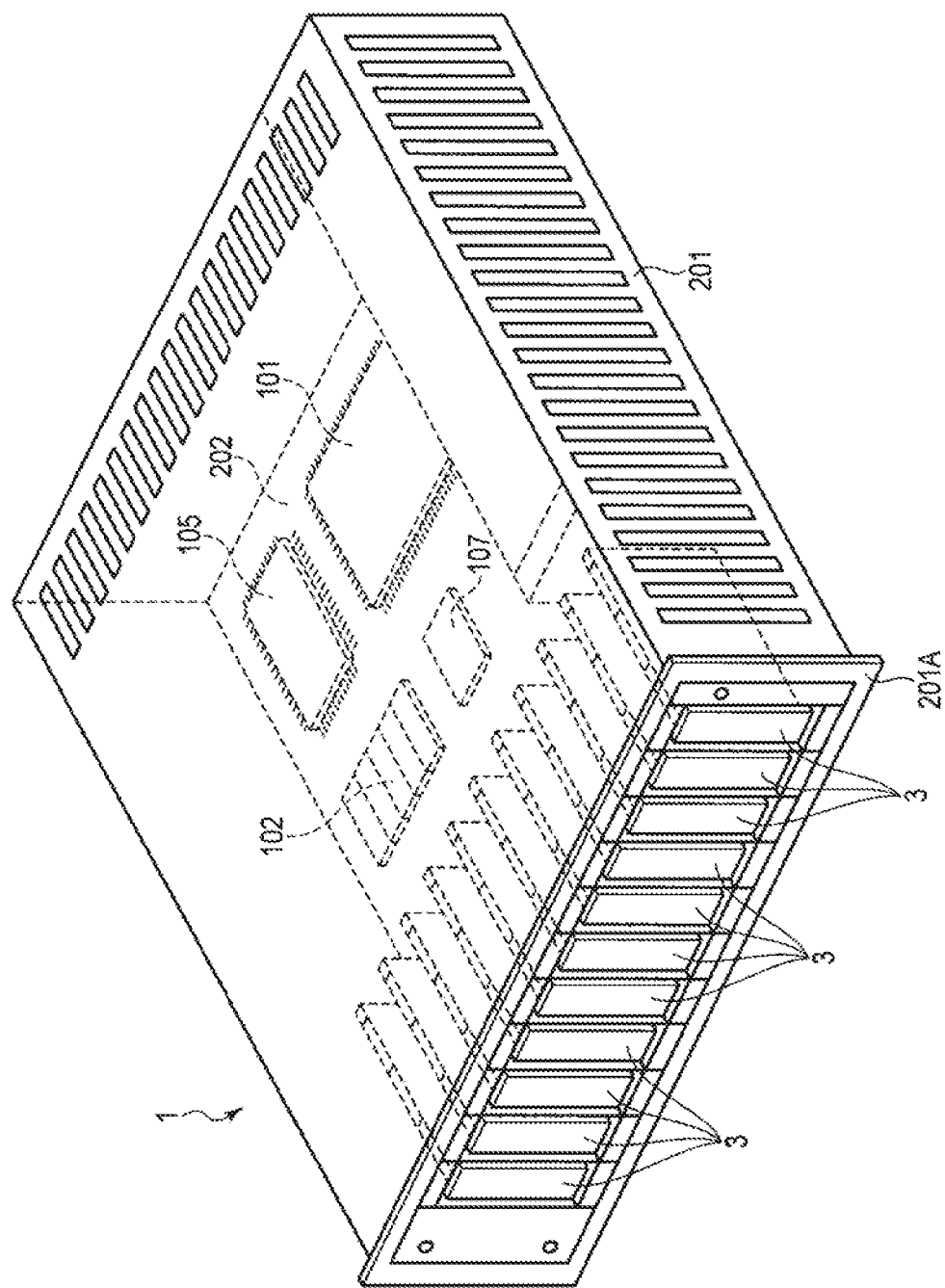
FIG. 14 illustrates a configuration of a computer which includes the memory system according to the embodiment and the host.

FIG. 14 illustrates an exemplary configuration of the information processing device which includes the plurality of SSDs 3 and the host 2.

The information processing device includes a housing 201 of a thin box shape which is stored in a rack. A number of SSDs 3 may be disposed in the housing 201. In this case, the SSDs 3 may be detachably inserted into slots provided in a front surface 201A of the housing 201.

A system board (mother board) 202 is disposed in the housing 201. On the system board (mother board) 202, various electronic components including the CPU 101, the memory 102, the network controller 105, and the controller 107 are mounted. These electronic components serve as the host 2.

As described above, a variation in write latency can be reduced according to the present embodiment. The memory system according to the present embodiment includes the NAND memory (nonvolatile memory) 5, and the controller 4 which is electrically connected to the NAND memory 5. The controller 4 sequentially selects data portions in the GC target block 551 which is selected as the target block of the garbage collection from the NAND memory 5. When the selected data portion is valid, the controller 4 copies the data portion from the free block group 51 in the NAND memory 5 to the GC copy destination block 512 allocated as the copy destination block for the garbage collection. When the selected data portion is invalid, the controller 4 performs the garbage collection operation in which the number of accumulated invalid data portions, which indicates the number of invalid data portions found out during the garbage collection operation, is incremented by "1". The controller 4 allows reception of the write data portion from the host 2 within the range of the number of accumulated invalid data portions, and decreases the number of accumulated invalid data portions by the number of received write data portions.

As a result, the host write operation and the garbage collection operation can be processed at the same time by a simple control of counting the number of invalid data portions which is found out during the garbage collection operation. Therefore, the variation in write latency can be decreased.

In the above embodiment, the NAND memory is exemplified as the nonvolatile memory. However, the function of this embodiment is applicable to other various nonvolatile memories such as an MRAM (Magnetoresistive Random Access Memory), a PRAM (Phase change Random Access Memory), a ReRAM (Resistive Random Access Memory), and a FeRAM (Ferroelectric Random Access Memory).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device that is configured to perform read and write operations based on read and write commands output from a host, comprising:
    a controller;
    a buffer that comprises a volatile memory; and
    a nonvolatile memory including a plurality of blocks, wherein each of the blocks includes a plurality of pages, wherein:
    the controller is configured to:
        associate one or more blocks of the nonvolatile memory with a first namespace such that data associated with the first namespace are selectively stored therein;
        associate other one or more blocks of the nonvolatile memory with a second namespace such that data associated with the second namespace are selectively stored therein;
        carry out garbage collection by reading data from one or more pages of a target block of the garbage collection and selectively copying valid data included in the read data to another block,
        determine during the garbage collection an amount of invalid data included in the read data, and
        receive, in the buffer during the garbage collection, first write data from the host up to a first size which depends on the determined amount of invalid data;
        wherein the garbage collection and the determining of the amount are carried out independently with respect to each of the first and second namespaces, and
        wherein third write data associated with the first namespace and fourth write data associated with the second namespace are received in the buffer up to a maximum amount which is determined based on a sum of the determined amount for the first namespace and the determined amount for the second namespace.

2. The storage device according to claim 1, wherein the controller is further configured to decrease the sum of the determined amounts by an amount of the first write data received in the buffer, during the garbage collection.

3. The storage device according to claim 1, wherein the controller reads the data from the target block of the garbage collection until the valid data included in the read data amount to a size of one page, and then receive the first write data from the host up to the sum of the determined amounts.

4. The storage device according to claim 1, wherein the controller is further configured to count a number of non-written portions in a block in which second write data in the buffer is to be written, and accept, in the buffer, the second write data from the host, up to an amount corresponding to the counted number of non-written portions, while the garbage collection is not carried out.

5. The storage device according to claim 1, wherein the controller is further configured to start the garbage collection upon determining that a number of free blocks in which no valid data are stored is less than a threshold.

6. The storage device according to claim 1, wherein the controller is further configured to map the target block for the garbage collection as a free block in which no valid data are stored after the valid data in all pages of the target block are copied.

7. The storage device according to claim 1, wherein the garbage collection, the determining of the amount, and the receiving of the first write data from the host are carried out independently with respect to each of the first and second namespaces.

8. A method of operating a storage device including a buffer that comprises a volatile memory, and a nonvolatile memory including a plurality of blocks, the storage device configured to perform read and write operations based on read and write commands output from a host, wherein each of the blocks includes a plurality of pages, the method comprising:
    associating one or more blocks of the nonvolatile memory with a first namespace such that data associated with the first namespace are selectively stored therein;
    associating other one or more blocks of the nonvolatile memory with a second namespace such that data associated with the second namespace are selectively stored therein;
    carrying out garbage collection by reading data from one or more pages of a target block of the garbage collection and selectively copying valid data included in the read data to another block;
    determining during the garbage collection an amount of invalid data included in the read data; and
    receiving, in the buffer during the garbage collection, first write data from the host up to a first size which depends on the determined amount of invalid data,
    wherein the garbage collection and the determining of the amount are carried out independently with respect to each of the first and second namespaces, and
    wherein third write data associated with the first namespace and fourth write data associated with the second namespace are received in the buffer, up to a maximum amount which is determined based on a sum of the determined amount for the first namespace and the determined amount for the second namespace.

9. The method according to claim 8, further comprising:
decreasing the sum of the determined amounts by an amount of the first write data received in the buffer, during the garbage collection.

10. The method according to claim 8, wherein
the data are read from the target block of the garbage collection until the valid data included in the read data amount to a size of one page, and then the first write data from the host up to the sum of the determined amounts are received in the buffer.

11. The method according to claim 8, further comprising:
during a write operation during which the garbage collection is not carried out, counting a number of non-written portions in a block in which second write data in the buffer is to be written, and receiving, in the buffer, the second write data from the host, up to an amount corresponding to the counted number of non-written portions.

12. The method according to claim 8, wherein
the garbage collection is started upon determining that a number of free blocks in which no valid data are stored is less than a threshold.

13. The method according to claim 8, further comprising:
mapping the target block for the garbage collection as a free block in which no valid data are stored after the valid data in all pages of the target block are copied.

14. The method according to claim 8,
wherein
the garbage collection, the determining of the amount, and the receiving of the first write data from the host are carried out independently with respect to each of the first and second namespaces.

* * * * *